United States Patent [19]
Neulinger

[11] Patent Number: 5,781,525
[45] Date of Patent: Jul. 14, 1998

[54] RECORD OPTIMIZER SYSTEM AND METHOD OF UTILIZATION

[76] Inventor: Samuel Neulinger, 14 North Dr., Flushing, N.Y. 11357

[21] Appl. No.: 829,360

[22] Filed: Apr. 2, 1997

[51] Int. Cl.$^6$ .......................... G11B 17/028; G11B 17/32
[52] U.S. Cl. .............................. 369/270; 369/58
[58] Field of Search ................................ 369/258, 264, 369/270, 271, 55, 58; 360/99.12

[56] References Cited

U.S. PATENT DOCUMENTS

| | | | |
|---|---|---|---|
| 4,260,161 | 4/1981 | Frank | 369/271 |
| 4,875,118 | 10/1989 | Kaymaram | 369/271 |

FOREIGN PATENT DOCUMENTS

| | | | |
|---|---|---|---|
| 121374 | 2/1931 | Austria | 369/270 |

*Primary Examiner*—Stuart S. Levy
*Assistant Examiner*—Kevin M. Watkins
*Attorney, Agent, or Firm*—Michael I. Kroll

[57] ABSTRACT

The present invention relates to a record optimizer system which functions to adjust a height of a phonograph record which maximizes fidelity reception from a turntable tone arm with a mounted cartridge. The system comprises a measuring spindle which is removably attachable to a measuring base platter of a measuring base. The system further comprises a center label cut out optimizing disc which is positioned upon the measuring base platter or a standard optimizing disc. The standard optimizing disc is positioned upon the measuring base platter. The measuring spindle post is positioned within an opening of the standard optimizing disc platter. The system further comprises a weight disc removably positioned on top of the phonograph record which is positioned on top of the standard optimizing disc. The system further comprises a tuning disc set which is positioned between the standard optimizing disc and the phonograph record.

9 Claims, 32 Drawing Sheets

NOTE: OPTIMIZING DISK NUMBERS USED BELOW ARE AS FOLLOWS:

THINNEST #1 (FIG 3) - 212 SECOND CENTER LABEL CUT OUT OPTIMIZING DISC

NEXT #2     (FIG 2) - #112 FIRST CENTER LABEL OPTIMIZING DISC

NEXT #3     (FIG 6) - #314 THIRD STANDARD OPTIMIZING DISC

NEXT #4     (FIG 5) - #214 SECOND STANDARD OPTIMIZING DISC

NEXT #5     (FIG 4) - #114 FIRST STANDARD OPTIMIZING DISC

| REFERENCE RECORD - MOBILE FIDELITY 200 GRAM RE-ISSUES    USE MEASURING SPINDLE #1 (FIG 118) ||
|---|---|
| TO OPTIMIZE RECORD LABEL BELOW TO ABOVE REFERENCED RECORD | USE OPTIMIZING DISK(S) |
| CHESKY RC-4 | #1 PLUS #4 PLUS #5 |
| CHECKEY RC-30 | #3 PLUS #5 |
| CHESKY RC-110 | #5 |
| CLASSIC RECORDS 180 GRAM RE-ISSUE | #3 |
| DECCA SXL 6 SERIES | #5 |
| DGG 2530 SERIES | #5 |
| EMI ASD 28 SERIES | #4 PLUS #5 |
| EMI/BOVEMA HOLLAND C 051 SERIES | #1 PLUS #5 |
| EMI/ODEON FRANCE C063 SERIES | #1 PLUS #4 |
| LONDON CS 71 SERIES | #1 PLUS #5 |
| NONESUCH H SERIES | #2 PLUS #5 |
| RCA LSC 25 SERIES | #5 |
| SHEFFIELD LABS LAB SERIES | #1 PLUS #4 PLUS #5 |
| VERVE V6 40 SERIES | #3 PLUS #5 |
| VERVE MGV 40 SERIES | #5 |

FIG 13B

RECORD OPTIMIZER SYSTEM AND METHOD OF UTILIZATION

BACKGROUND OF THE INVENTION

1. Field of the Invention:

The present invention relates to a record optimizer system. More particularly, the present invention relates to a record optimizer system which utilizes various sized discs which vary in thickness.

2. Description of the Prior Art:

The playback of vinyl records is accomplished by rotating the record on a turntable at a constant speed and applying a stylus which is contained in a cartridge mounted to a tone arm to the grooves imbedded in the record.

In order to extract and reproduce the most accurate sound from the record grooves, the stylus should approximate the same vertical tracking angle (VTA) or stylus rake angle (SRA), as the original cutting head did when the grooves were originally cut to produce the record. This is normally accomplished by setting up the tone arm according to the manufacturer's instructions, selecting a record and then re-adjusting the arm in increments on a trial and error basis while listening for the best and most accurate sound reproduction.

There are two types of tone arms. The first is a straight line tracking device that remains parallel to a line drawn across the center of the record at all times; this type of tone arm is the most accurate as it mimics the action of the original cutting head which is also a straight line cutting device. The second is a pivotable tone arm, which is the more conventional type, which traverses in the record groove in a slightly arcuate path from the beginning to the end of a record.

Both types of tone arms may have as an adjunct to their design the ability to adjust the VTA (raising or lowering the height of the arm) in relation to the record grooves, either while playing the record, or on a trial and error basis, by adjusting the arm and then listening for the results of the adjustments.

VTA adjustment is accomplished by raising or lowering the height of the tone arm in relation to the record on the turntable platter. However, for accurate reproduction the VTA is critical and not all records are the same thickness. Therefore once the proper VTA is set for one particular record, if a different record is put onto the turntable that is not the same thickness as the one for which the VTA was set, the VTA must once again be adjusted. Normally the listener establishes and sets the VTA for the particular brand of records that are listened to most frequently. Aside from VTA there is an optimum adjustment known as "stylus overhang" relative to pivotal tone arms as defined by "Baerwald". The Baerwald Article states that for a pivot type tone arm on a 12" diameter record, the overhang of the stylus should be such that would cause the stylus to cross over two points on such record so as to provide the least average tracking error of the stylus in the record grooves. The Baerwald Article located these points, called the "null points" on circles of radii respectively of 2.600 and 4.670 inches from the spindle or axis of the turntable. Once the points are established by adjusting both the tone arm and the cartridge by use of a template or a device such as "Dennesen, et. Al., Pat. #4,295, 277, Oct. 20, 1981", they are locked into place, and then VTA is set for the record in question.

The problem is that each time VTA is set for a record of a different thickness, the overhang originally set under the Baerwald Article changes. Straight line tracking tone arms have a similar problem, in that as the tone arm is raised or lowered to adjust for VTA, the stylus no longer intersects the radius of the turntable unless automatically compensated for, such as the straight line tracking arm under "Thigpen, et. Al., Pat. #4,628,500, Dec. 9, 1986". However, pivotal tone arms that do have VTA adjustments as part of their architecture, only have the ability to raise or lower the stylus in relation to the record grooves.

The only time that the stylus tip will be in the same location as originally set, i.e., VTA AND Overhang (or in the case of straight line tracking arms intersecting the radius of the turntable), will be when the same thickness record is set onto the turntable, for which the adjustments were originally set.

For best overall sound, the turntable platter, usually acrylic, should remain coupled to the vinyl record so that it can "help terminate energy from the stylus, pickup arm, and record by distributing it evenly through the platter, reducing the storage and re-release of that energy back into the record" (quote from an article by Anthony H. Cordesman in a review of the VPI TNT Series III turntable in issue 94 of the Absolute Sound).

All prior art approaches the concept of VTA adjustment from the point of adjustment of the tone arm, except for an article by Enid Lumley in the "Absolute Sound", Volume 12, Issue 51, Winter 1988, pp. 219–222 (attached) which deals with the "Malpenoll" air-bearing turntable which can be raised or lowered by adjusting the air pressure in the supplied air pump, and in part with VTA/SRA adjustments using paper of different thicknesses placed between the turntable platter and the record to act as "shims" to fine tune the VTA/SRA.

Some inexpensive tone arms on record players do not have any height adjustment and may have to use shims between the bottom base of the arm and the turntable to raise the height of the arm to an optimal level. Most tone arms have a set of screws where the pillar (or pillars or rails for linear straight line tracking arms) supporting the arm can be raised or lowered while the set screw (s) is loose and then tightened at the appropriate place. These arms normally do not have any built-in method of repeating a setting. The more expensive tone arms may have a built-in VTA micrometer dial having calibration marks. Some dials can be used while a record is playing but others cannot.

An inability to properly adjust the Vertical Tracking Angle (VTA) of a non-adjustable tone arm when playing phonograph records of different manufacturers due to the varying thicknesses of the records to be played as well as the difficulty and inconsistency of VTA adjustment when changing records using a tonearm that does not have VTA adjustment capabilities while the record is being played.

The reference VTA and overhang is set by starting with the thickest record normally played. Previously there was no real reference as each record company manufactured its records without consideration for uniformity of thickness. Today, there is a resurgence in the production of vinyl records, mostly re-issues of great classical, jazz and popular recordings no longer available, and new jazz and popular records. The new standard in these re-issues and original new recordings is "200 and 180 gram Audiophile Quality Vinyl" and in some cases "150 gram Audiophile Quality Vinyl". The important issue is that these new records are substantially thicker than the older records. The present invention provides several interchangeable measuring spindles of different heights to accommodate a variety of records including the new 200/180/150 gram records. A recent article in Issue 2, Volume 2 of "The Audio Voice" an audiophile publication, compares the sound between the same original recordings re-issued by two different companies. In the "Methodology" section, the author John Hellow, describes the setting up of the comparisons as follows:

"I was asked by the editors to be extremely careful with the comparison to ensure that it was as accurate as possible. To that end, I agreed to work with the VTA for each of the pressings in question, and vary the fluid damping available with the Goldmund T3F arm to allow each pressing its best presentation. All in all, the rigors of this comparison made it distinctly less enjoyable to listen to these fine recordings. Any VTA adjustment on the Goldmund arm requires a solid five to ten minutes of work. Once I recorded the VTA preferred by each pressing I listened to a side of each, and then five minute intervals of each in semi-rapid succession. The Goldmund is not the arm of choice if you desire to engage in rapid comparisons of the effects of VTA on different pressings of the same recording. The number of such adjustments was compounded by the fact that Chesky's RC-4 and RC-5 were pressed on 150 gram vinyl and are considerably thinner than the 180 gram vinyl used in all the Classic re-issues and Chesky's recent re-issue of the Offenback, RC-110."

Numerous innovations for record optimizing systems have been provided in the prior art that are described as follows. Even though these innovations may be suitable for the specific individual purposes to which they address, they differ from the present invention as hereinafter contrasted.

In Pat. No. 4,628,500, titled Air Bearing Straight Line Tracking Phonograph Tonearm, invented by F. Bruce Thigpen and Edison A. Price, an air bearing straight line tracking phonograph tone-arm combines the features of a readily removable decoupled counterweight arm which bears horizontally and vertically adjustable counterweights; a readily removable tonearm tube with tapered wall thickness having an integral headshell, cartridge and stylus; various simple means for vertical and leveling adjustments; and a vertical tracking angle or stylus rake angle control that automatically retains perfect tracking tangency.

In Pat. No. 4,455,641, titled Linear Tracking System, invented by Alan P. Sliski, in a linear tone arm tracking system for a record player where the stylus tone arm moves on a guiderail across a recording, e.g. A record disc on a turntable, an improvement is provided in which the stylus tone arm is connected to a partial sleeve, which sleeve hovers partially over the guiderail and means, such as air pressure means, causes the partial sleeve to hover over the guiderail in proximity therewith, so that when the stylus rides in the record groove and is laterally shifted thereby, the tone arm and partial sleeve readily shift over the guiderail in response to the shift of the stylus. Further provided is a means for raising and lowering the guiderail which adjusts the elevation of the partial sleeve and tone arm and accordingly adjusts the vertical tracking angle of the stylus in the record groove.

In Pat. No. 4,325,132, titled Unitary Phonograph Cartridge and Head Assembly, invented by John P. Kuehn, a unitary headshell and phonograph cartridge assembly in which the vertical angle and overhang dimension can both be independently adjusted, thereby to permit the cartridge assembly to be used with different heights of record player arms and to achieve minimum tracking angle distortion for the particular tone arm with which the cartridge assembly is utilized.

The above described patented inventions differ from the present invention because they lack one or more of the following features: weight disc, measuring base platter with measuring base platter spindle receptacle, equalizer disc, center label cut out optimizing disc, standard optimizing disc, measuring spindle, spindle/base spacer, tuning disc set, and fine tuning disc set.

Numerous innovations for record optimizer system have been provided in the prior art that are adapted to be used. Even though these innovations may be suitable for the specific individual purposes to which they address, they would not be suitable for the purposes of the present invention as heretofore described.

SUMMARY OF THE INVENTION

A reference base made of any suitable material such as plastic, acrylic, vinyl, etc., resembling a turntable platter with a center female thread, to accept interchangeable measuring spindles having male screw threads. The height of the measuring spindle when screwed into the base is the same as the reference record. Platters of varying thickness called optimizing discs, similar to records but much thinner without grooves are manufactured from similar materials having the same properties that records are manufactured from, i.e., vinyl, and/or acrylic which is similar to the material that most turntables are manufactured from (acrylic has an acoustic impedance similar to that of vinyl). In another embodiment, the optimizing discs as described above have a 4" center label portion cut out. There are also fine tuning disc sets made of similar materials as the optimizing discs but are smaller and thinner than the optimizer discs. A clear LUCITE™ round weight with center hole on bottom and slight protrusion on top is placed on top of the combination of optimizing discs and on top of the phonograph record being optimized which is on the base and measuring spindle insuring that the combination is level with the top of the measuring spindle. The center protrusion of the LUCITE™ weight can be used in the same manner by confirming that the center protrusion does not extend downward into the spindle hole of the record. If it does, then the combination requires further optimization.

The present invention has a set of thin spacers that can be used individually or in combination, to fit between the measuring base spindle receptacle and the measuring spindles functioning to increase the height of the measuring spindles to accommodate thicker records that may be produced in the future.

The present invention also has a printed table of parameters for the most older popular record labels, stating which optimizing disc(s) and/or fine tuning disc set(s) are necessary to match various references, i.e., Mobile Fidelity 200 Gram, Classic Records 180 gram, Chesky 150 gram, etc.

The VTA and overhang is first established and set using the tonearm mounted on the turntable for the reference record (usually the thickest record that will be used) which then becomes the reference against which all subsequent records will be optimized using the present invention resulting in "Constant Medium Height". It is important to note that whatever VTA and/or overhang alignment tool is used it should be adjusted to be the same height as the reference record. Any part of the present invention can be used to accomplish that goal.

The reference record is then put on to the reference base and a measuring spindle conforming to the thickness of the reference record is screwed into the base. If spacers are required they are used at this time. The reference record is then removed from the base.

The record to be optimized (not the same thickness) to the reference previously set-up, is placed upon the base containing the measuring spindle that conforms to the same height as the thickness of the reference record. Optimizing disc(s) are then placed under the record on the base until the combination of record and disc(s) is even with the top of the measuring spindle. Slight hand pressure is applied in a downward motion near the center of the combination to confirm that the top of the combination and the top of the measuring spindle are even and/or the lucite weight can be placed on top of the combination of records and disc(s) to apply pressure to the combination to confirm that the measuring spindle does not extend upwards into the center hole of the lucite weight by trying to move it back and forth. If it does not move the measuring spindle is still higher than the combination and as it is not level with the measuring spindle, the combination requires further optimization. The center protrusion of the LUCITE™ weight can be used in the same manner by confirming that the center protrusion does not extend downward into the spindle hole of the record. If it does, then the combination requires further optimization.

After the record has been optimized, the disc(s) are removed and set onto the turntable with the record set on top of the discs. At this point the optimized record sits on the turntable at the same height as the reference and can be played with optimum results as the acceptable Vertical Tracking Angle zone has been attained, without further adjustment being required. The tuning discs and or fine tuning discs can be used directly on the turntable under the optimized record for experimentation purposes for further possible improvement in the reproduced sound. Once established, the combination is noted on a label on the record sleeve or jacket, and when played again the combination is put directly onto the turntable providing immediate proper VTA and overhang without any further tonearm adjustment required.

The use of the reference base and measuring spindle(s) enable a reference to be easily set. The optimizing discs and fine tuning disc sets (if needed) provide a "constant energy coupling surface" between turntable, optimizing platter(s) and vinyl record while allowing VTA to remain constant with the original setting (reference VTA) by placing the proper thickness optimizing disc(s) and or fine tuning disc sets(s) between the turntable and record (constant medium height), thus maintaining the highest quality of sound reproduction.

The following is intended as an example of the use of the first embodiment of the present invention and should not be construed in limitation thereof.

EXAMPLE 1

A fine quality high fidelity turntable with a straight line tracking tonearm and stereo cartridge was activated and a 12" 200 gram Audiophile Quality re-issued major label record was set down on it. The arm and cartridge were adjusted to optimum overhang and VTA, and played. The recording sound was excellent and eminently satisfying, with deep bass, crisp highs, high definition of the various instruments, and a wide and deep sound staging between the speakers with no distortion.

The record was removed and an older mint record of the same performance as the re-issue was placed upon the turntable and played. The recording sound was generally good, but the wide and deep sound staging between the speakers was no longer evident, there was some diminution of definition as well as some shrillness, flatness, and distortion in the reproduced sound.

The record was removed and optimized using the present invention and an optimizing platter of the appropriate thickness of the present invention was put on the turntable underneath the older mint record and played. The recording sound was excellent and eminently satisfying, with deep bass, crisp highs, high definition of the various instruments, and wide and deep sound staging between the speakers with no distortion.

The same experiment was performed substituting tracing paper of various thicknesses for the platter of the present invention and played. The recording sound was fair, with moderate sound staging between the speakers with no distortion, but a pronounced flatness in the sound with less deep bass.

The present invention relates to a record optimizer system. More particularly, the present invention relates to a record optimizer system which utilizes various sized discs which vary in thickness.

To accommodate tone arms which are fixed and/or have too high an angle to be optimized using the regular optimizer discs, the present device utilizes an equalizer disc which is preferably a vinyl or similar material twelve inch (12") platter with a four inch (4") center label indentation. The equalizer disc is approximately 3/32"'thick which is utilized under the reference record and the optimized record at all times both when playing and when setting the reference, and in essence act as a sonically coupled turntable mat.

One type of problem encountered in the prior art is that records were manufactured with differing thicknesses.

In the prior art, unsuccessful attempts to solve this problem were attempted namely: having a tone arm with UP/DOWN adjustment means. However, the problem was solved by the present invention because it accommodates all records and instead of adjusting the tone arm to fit the record, it adjusts the record to fit the tone arm. In addition, the record optimizer system accommodates for the tone arms which are non-adjustable.

Innovations within the prior art are rapidly being exploited in the field of retrofitting pre-existing phonographic equipment.

The present invention went contrary to the teaching of the art which describes and claims adjustable tone arms.

The present invention solved a long felt need for a record optimizer system which can accommodate different thickness records as well as non-adjustable tone arms.

The present invention produced unexpected results namely: fidelity greatly increased.

A synergistic effect was produced utilizing the present invention due to the following facts and results from experimentation: by having the tone arm at the proper angle, wear to the phonographic record was greatly reduced.

Accordingly, it is an object of the present invention to provide a record optimizer system.

More particularly, it is an object of the present invention to provide a record optimizer system which comprises a weight disc.

In keeping with these objects, and with others which will become apparent hereinafter, one feature of the present invention resides, briefly stated, in the weight disc comprising a weight disc platter having a weight disc platter spindle opening and a platter spindle opening protrusion centrally positioned therein.

When the record optimizer system is designed in accordance with the present invention, it further comprises a measuring base.

In accordance with another feature of the present invention, the measuring base comprises a measuring base platter having a measuring base platter spindle receptacle and a measuring base platter label recess centrally positioned therein and thereon, respectively.

Another feature of the present invention is that the record optimizer system further comprises an equalizer disc which comprises an equalizer disc platter having an equalizer disc platter opening and an equalizer disc platter label recess centrally positioned therein and thereon, respectively.

Yet another feature of the present invention is that a reference phonograph record is utilized prior to the phonograph record to determine what spacers are required.

Still another feature of the present invention is that the record optimizer system further comprises a first center label cut out optimizing disc.

Yet still another feature of the present invention is that the first center label cut out optimizing disc comprises a first center label cut out optimizing disc platter having a first center label cut out optimizing disc platter opening centrally positioned therein.

Still yet another feature of the present invention is that a first standard optimizing disc comprises a first standard optimizing disc platter having a first standard optimizing disc platter opening and a first standard optimizing disc platter label recess centrally positioned therein and thereon, respectively.

Another feature of the present invention is that a first measuring spindle comprises a first measuring spindle post with a first measuring spindle post screw.

Yet another feature of the present invention is that a first spindle/base spacer comprises a first spindle/base spacer cylinder having a first spindle/base spacer cylinder opening.

Still another feature of the present invention is that it utilizes a tuning disc set.

Yet still another feature of the present invention is that it utilizes a fine tuning disc set.

Still yet another feature of the present invention is that a second cut out optimizing disc comprises a second cut out optimizing disc platter having a second cut out optimizing disc platter opening centrally positioned therein.

Another feature of the present invention is that a second standard optimizing disc comprises a second standard optimizing disc platter having a second standard optimizing disc platter opening and a second standard optimizing disc platter label recess centrally positioned therein and thereon, respectively.

Yet another feature of the present invention is that a second measuring spindle comprises a second measuring spindle post and a second measuring spindle post screw.

Still another feature of the present invention is that a second spindle/base spacer comprises a second spindle/base spacer cylinder having a second spindle/base spacer cylinder opening centrally positioned therein.

Yet another feature of the present invention is that a tuning disc set is utilized in conjunction with a fine tuning disc set.

Still yet another feature of the present invention is that a third standard optimizing disc comprises a third standard optimizing disc platter having a third standard optimizing disc platter opening and a third standard optimizing disc platter label recess centrally positioned therein and thereon, respectively.

Another feature of the present invention is that a third measuring spindle comprises a third measuring spindle post and a third measuring spindle post screw.

Yet another feature of the present invention is that a third spindle/base spacer comprises a third spindle/base spacer cylinder having a third spindle/base spacer cylinder opening therein.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

BRIEF DESCRIPTION OF THE DRAWING

FIG. 13B is a table of parameters covering major labels and may be expanded.

DESCRIPTION OF THE PREFERRED EMBODIMENT

Figure 1:
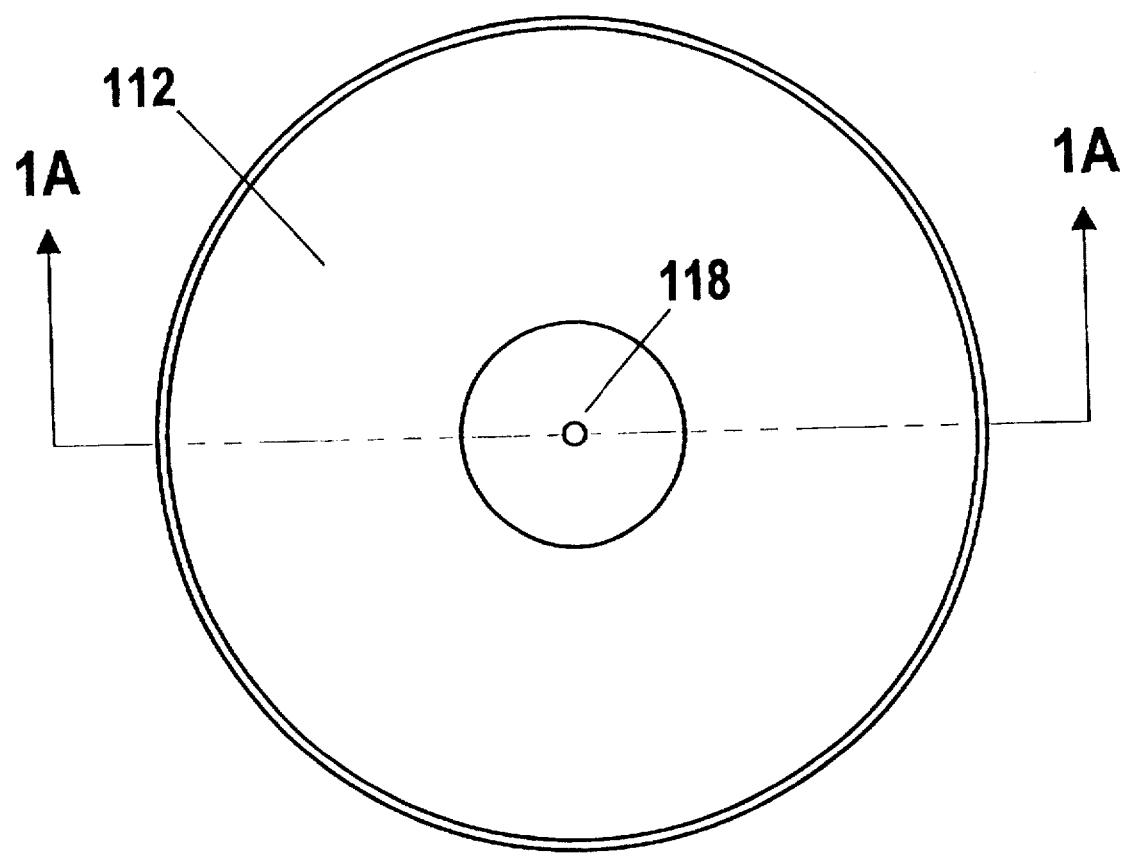
FIG. 1 is a top view of a first center label cut out optimizing disc positioned on top of a measuring base.
Figure 1A:
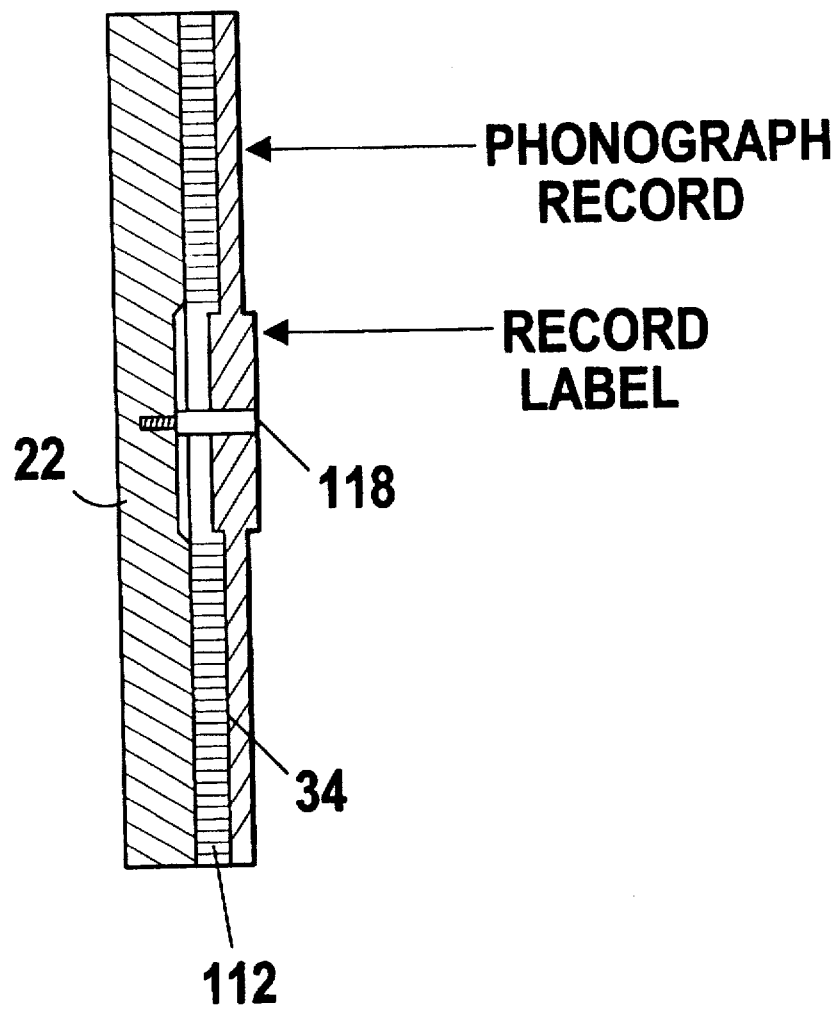
FIG. 1A is a cross sectional view along line 1A—1A of FIG. 1 of a phonograph record positioned on top of a first center label cut out optimizing disc positioned on top of a measuring base.
Figure 2:
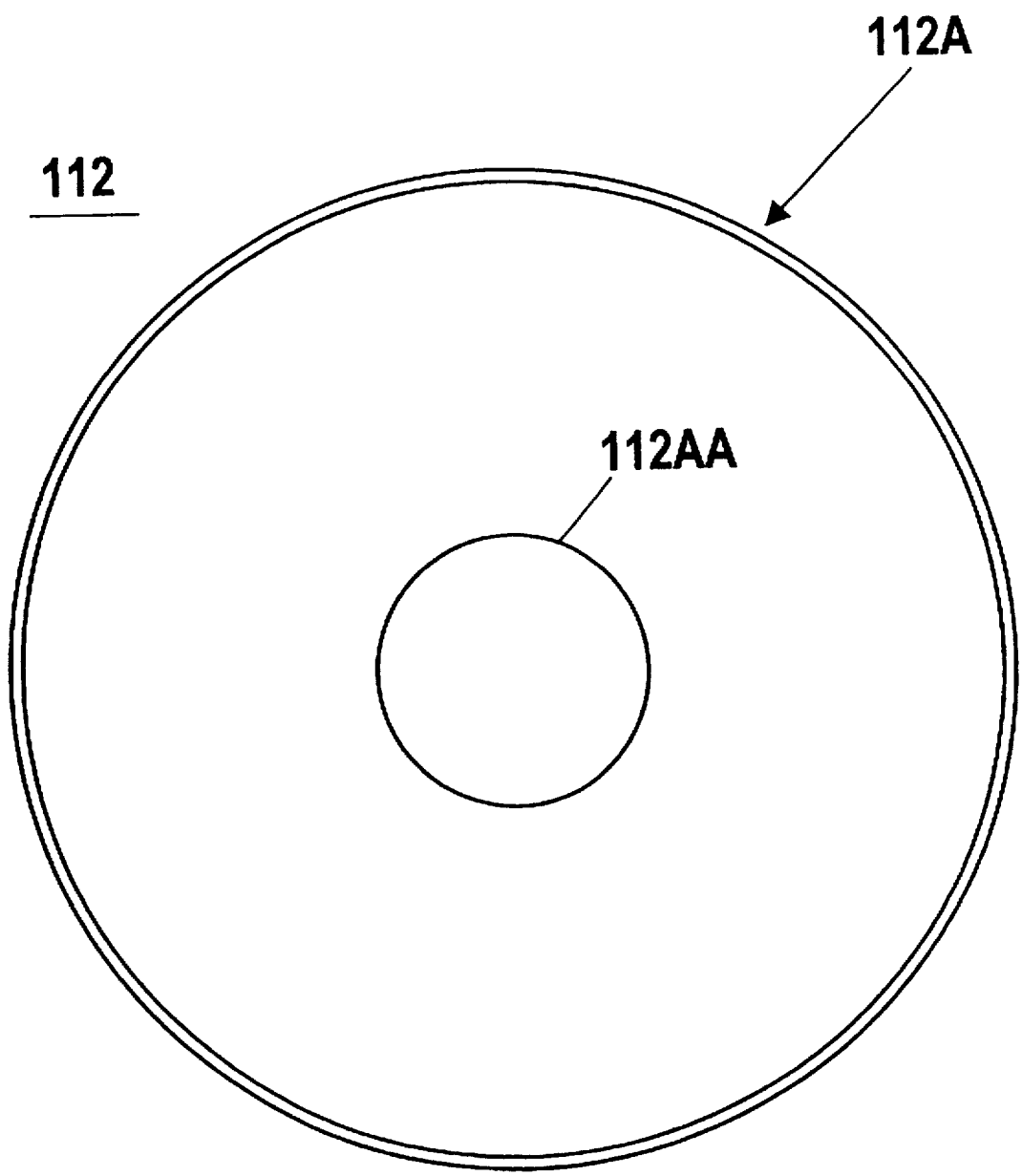
FIG. 2 is a top view of a first center label cut out optimizing disc.
Figure 2A:
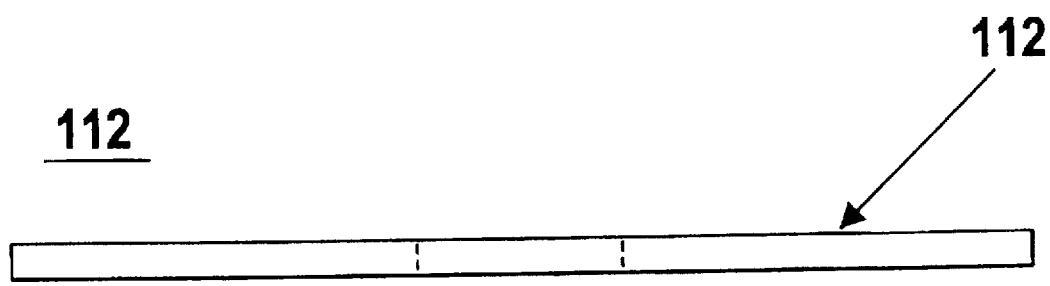
FIG. 2A is a side view of a first center label cut out optimizing disc.
Figure 3:
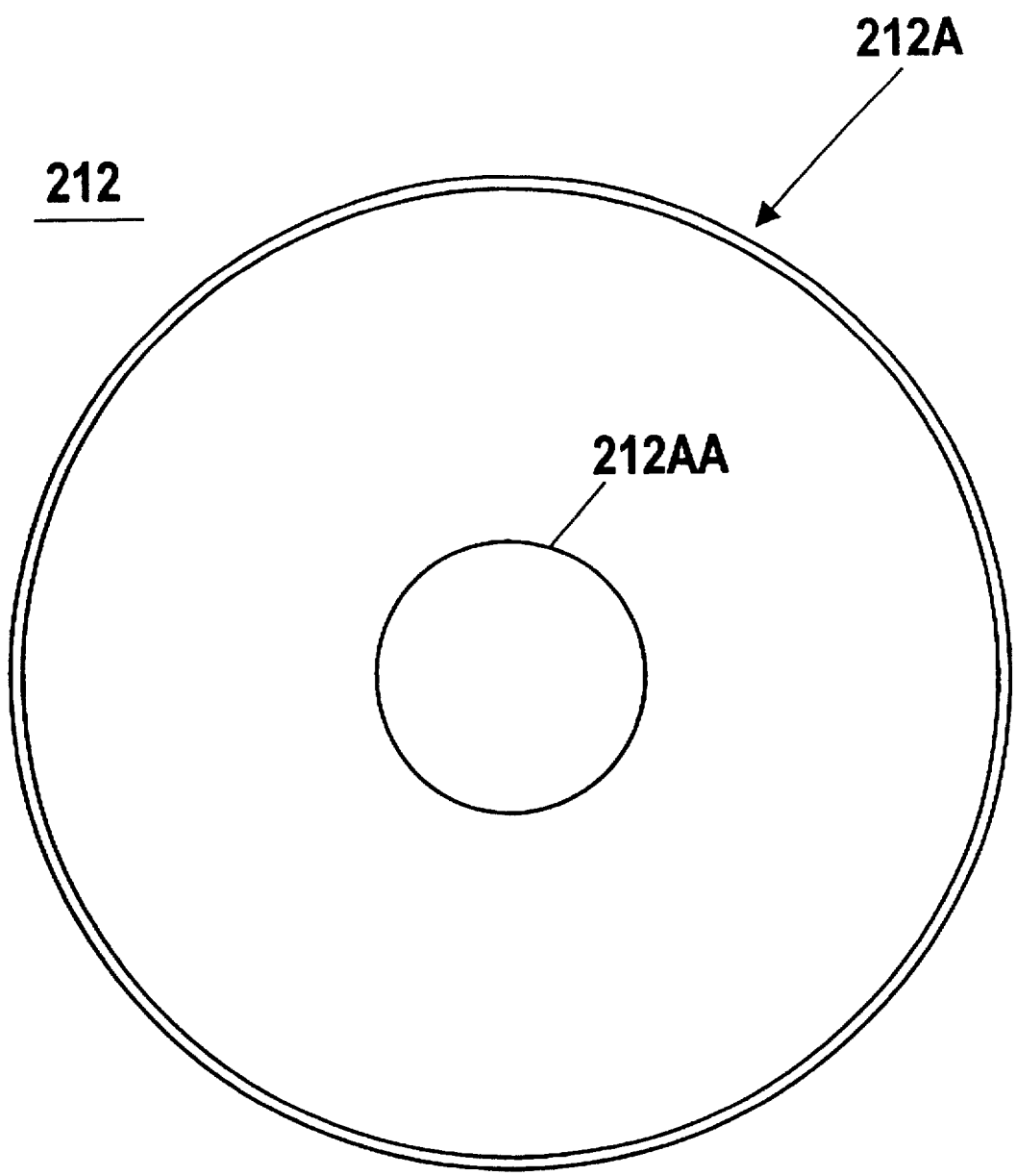
FIG. 3 is a top view of a second cut out optimizing disc.
Figure 3A:
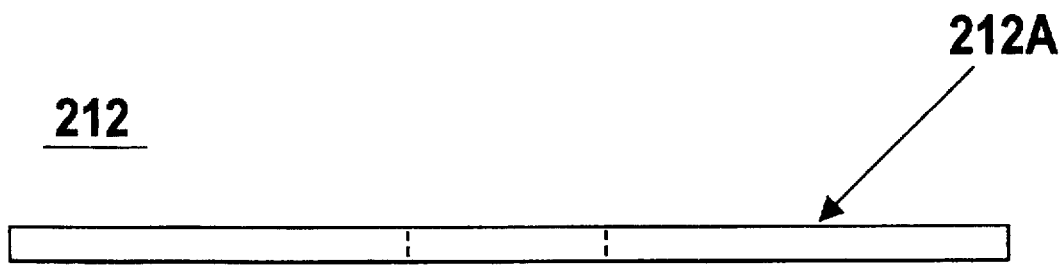
FIG. 3A is a side view of a second cut out optimizing disc.

Firstly, referring to FIG. 1 which is a top view of a first center label cut out optimizing disc (112) positioned on top of a measuring base (22). FIG. 1A is a cross sectional view along line 1A—1A of FIG. 1 of a phonograph record positioned on top of a first center label cut out optimizing disc (112) positioned on top of a measuring base (22). The present invention relates to a record optimizer system (10) which functions to adjust a height of a phonograph record (34) which maximizes fidelity reception from a turntable tone arm with mounted cartridge (32A) of a turntable (32). FIG. 2 and FIG. 2A are a top view and a side view, respectively, of a first center label cut out optimizing disc (112). FIG. 3 and FIG. 3A which are a top view and a side view. respectively, of a second center label cut out optimizing disc (212). A selected center label cut out optimizing disc (112, 212) which comprises a center label cut out optimizing disc platter (112A, 212A) having a center label cut out optimizing disc platter opening (112AA, 212AA) centrally positioned therein. The selected center label cut out optimizing disc (112, 212) is positioned upon the standard optimizing disc (114, 214, 314). A phonograph record (34) is positioned on the selected center label cut out optimizing disc (112, 212).

Figure 4:
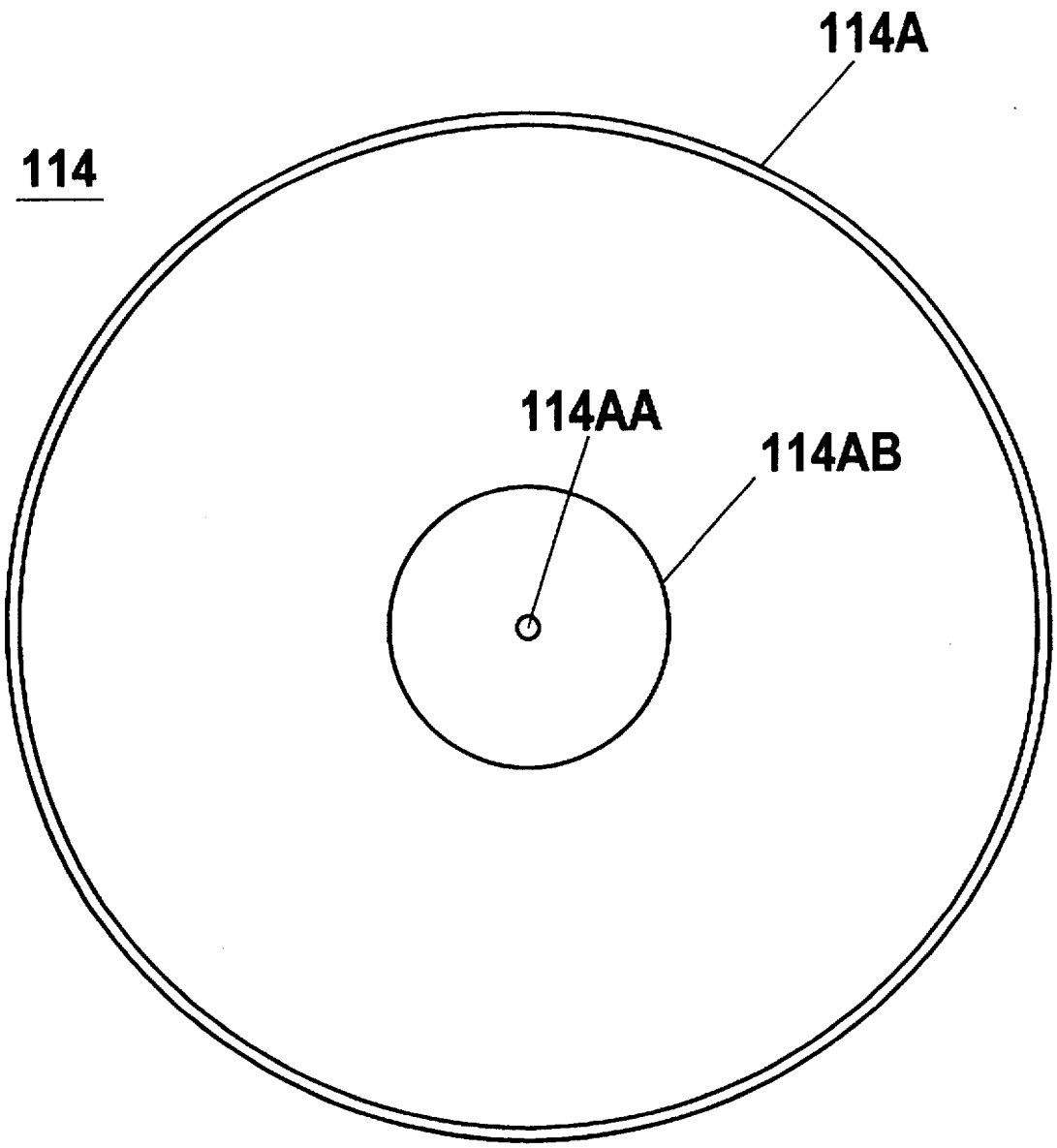
FIG. 4 is a top view of a first standard optimizing disc.
Figure 4A:
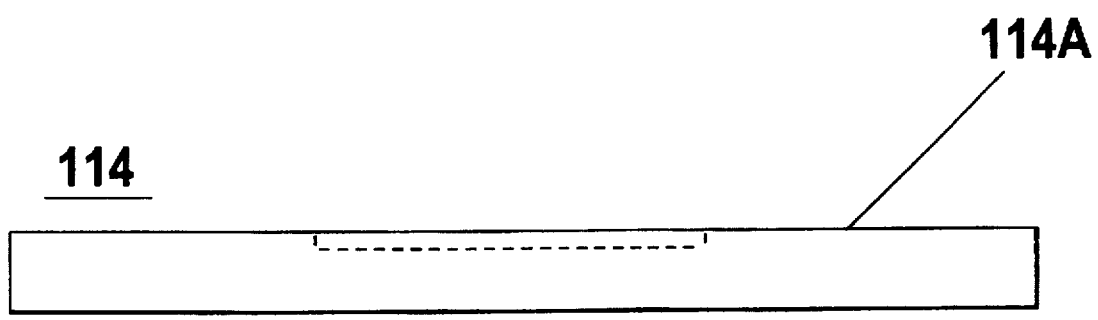
FIG. 4A is a side view of a first standard optimizing disc.

Now referring to FIG. 4 and FIG. 4A is a top view and a side view of a first standard optimizing disc (114). The record optimizer system (10) further comprises a standard optimizing disc (114, 214, 314) which comprises a standard optimizing disc platter (114A, 214A, 314A) having a standard optimizing disc platter opening (114AA, 214AA, 314AA) and a standard optimizing disc platter label recess (114AB, 214AB, 314A) centrally positioned therein and thereon, respectively. The standard optimizing disc (114, 214, 314) is positioned upon the measuring base platter (22A). The measuring spindle post (118A, 218A, 318A) is positioned within the standard optimizing disc platter opening (114AA, 214AA, 314AA).

Figure 5:
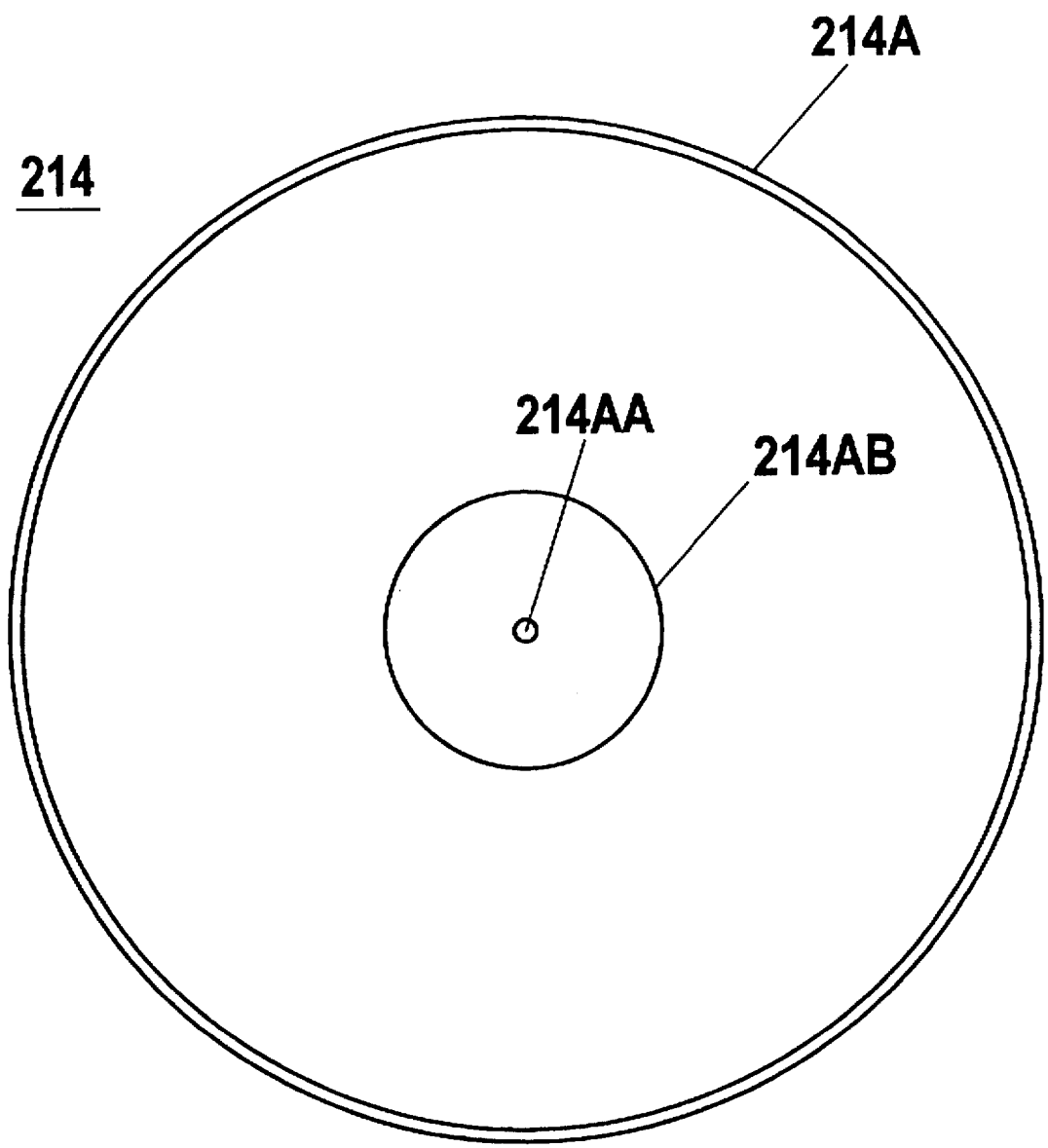
FIG. 5 is a top view of a second standard optimizing disc.
Figure 5A:
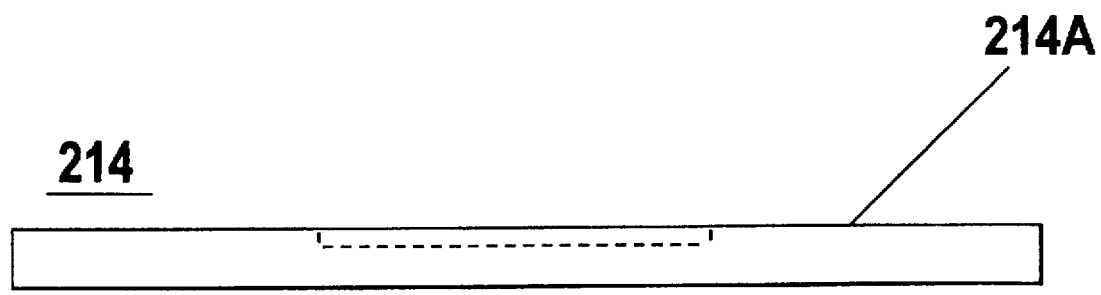
FIG. 5A is a side view of a second standard optimizing disc.
Figure 6:
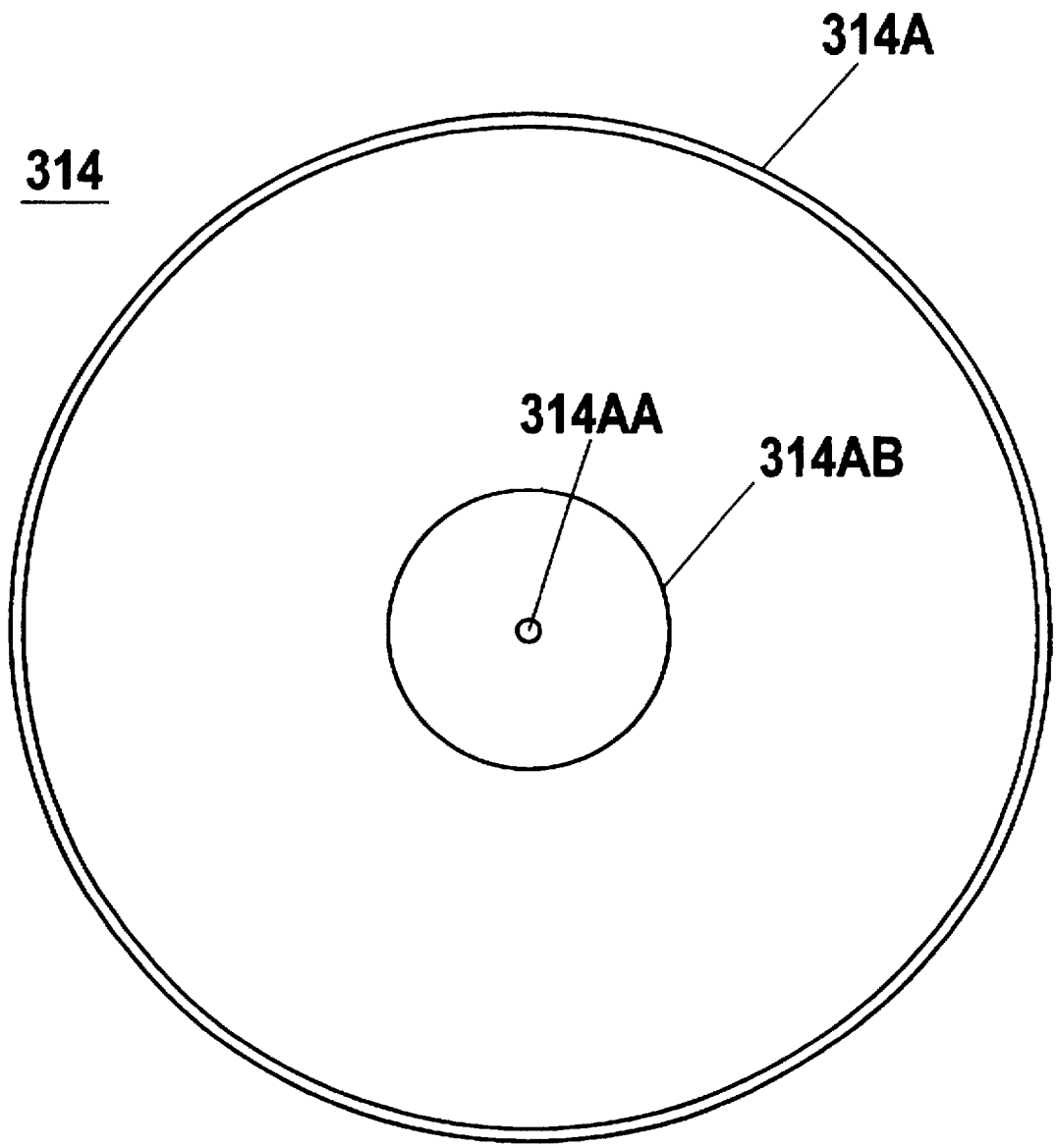
FIG. 6 is a top view of a third standard optimizing disc.
Figure 6A:
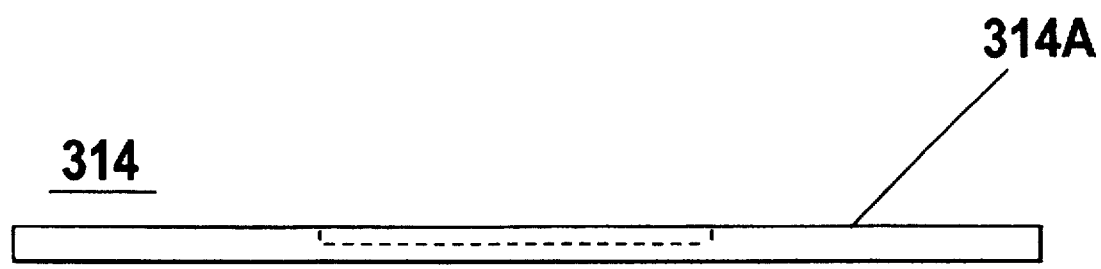
FIG. 6A is a side view of a third standard optimizing disc.
Figure 14:
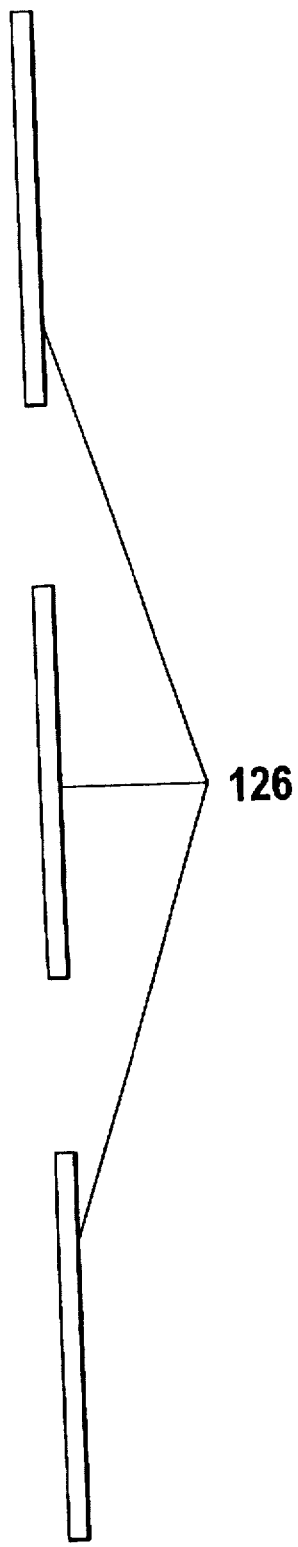
FIG. 14 is a top view of a set of fine tuning discs.
Figure 14A:
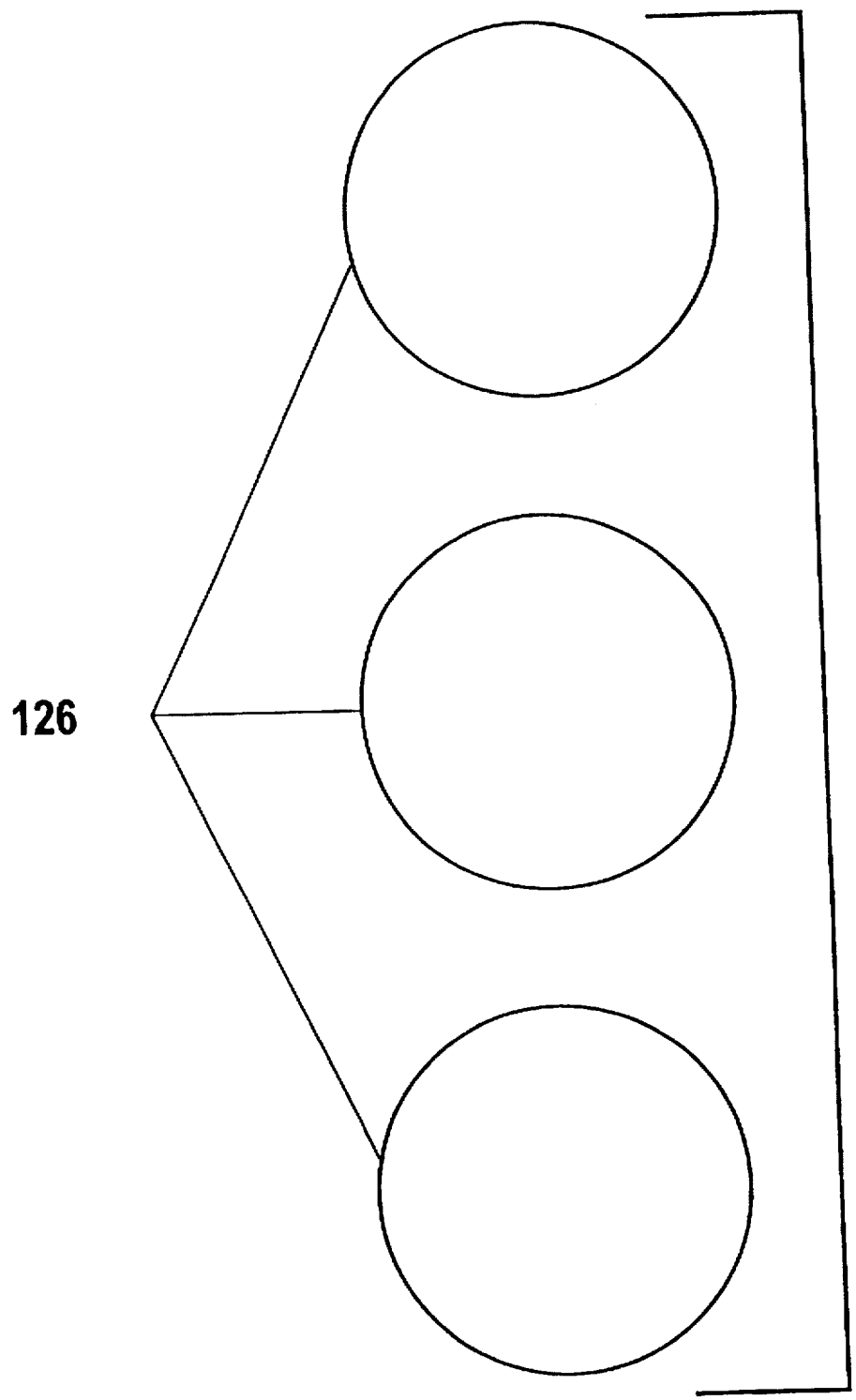
FIG. 14A is a side view of first set of fine tuning discs.
Figure 15:
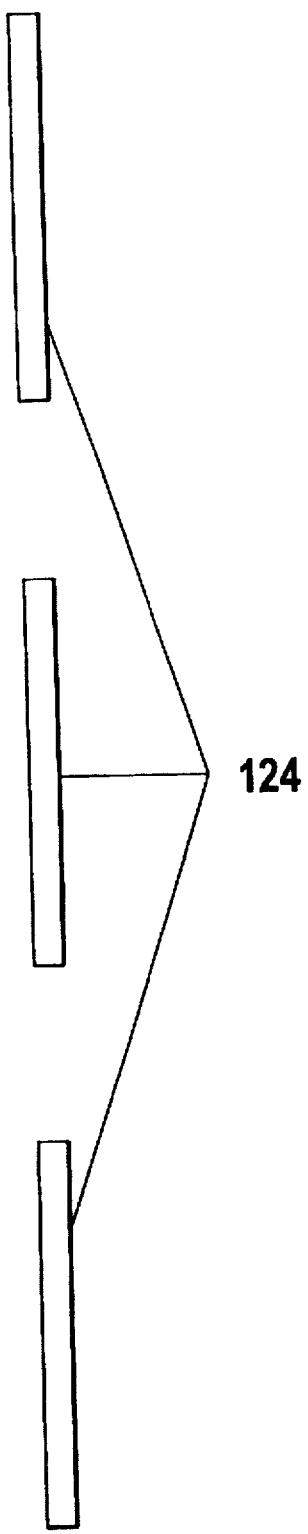
FIG. 15 is a top view of a set of fine tuning discs.
Figure 15A:
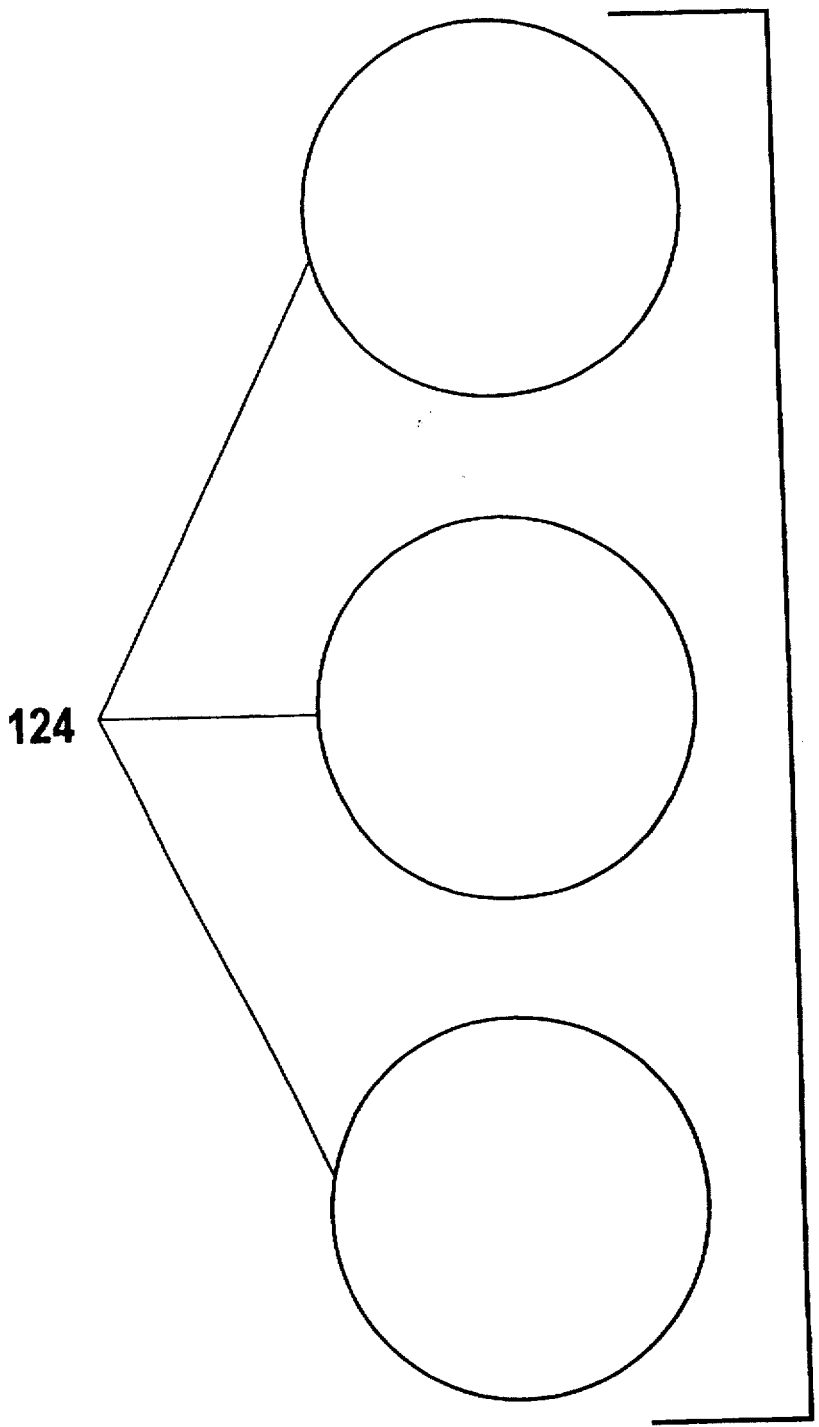
FIG. 15A is a side view of first set of tuning discs.

Referring to FIG. 5 and FIG. 5A which are a top view of a second standard optimizing disc (214). FIG. 6 and FIG. 6A are a top view and a side view, respectively, of a second standard optimizing disc (314). Referring to FIG. 14 and FIG. 14A which are a top view and a side view, respectively, of a set of fine tuning discs (126). Referring to FIG. 15 and FIG. 15A which are a top view and a side view, respectively, of a set of fine tuning discs (126). The record optimizer system (10) further comprises a tuning disc set (124) is positioned between the standard optimizing disc (114, 214, 314) and the phonograph record (34). The record optimizer system (10) further comprises a fine tuning disc set (126) positioned between the tuning disc set (124) and the phonograph record (34).

Figure 7:
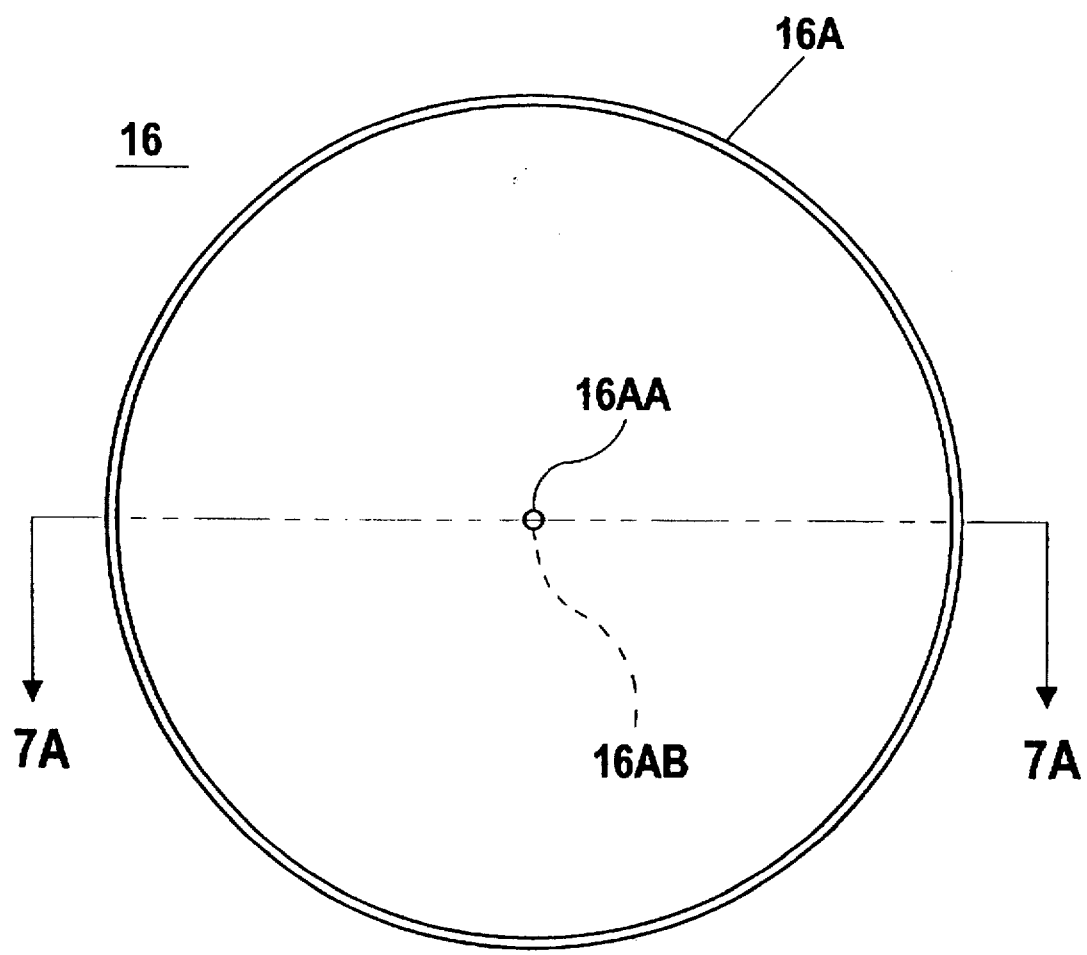
FIG. 7 is a top view of a weight disc.
Figure 7A:
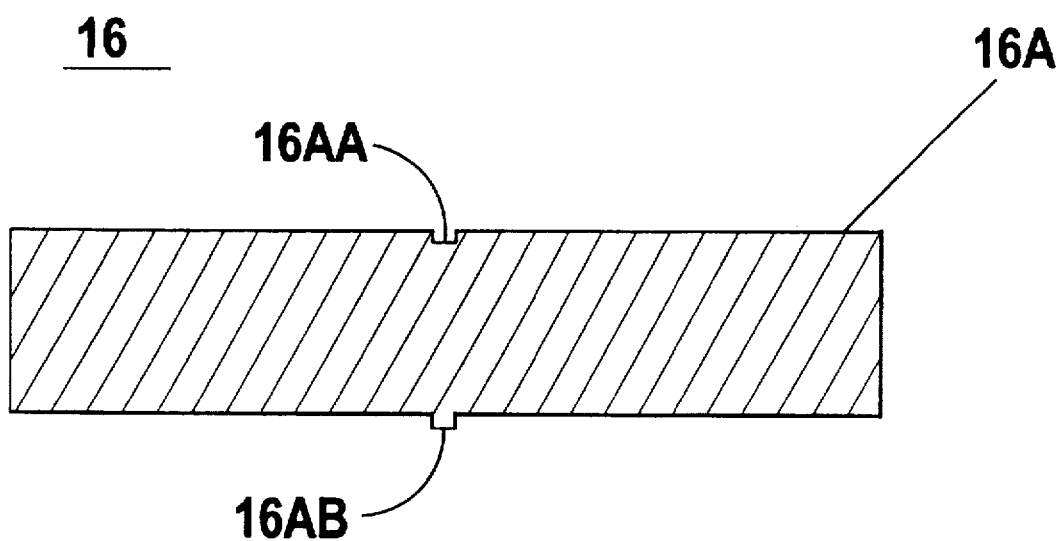
FIG. 7A is a side view of a weight disc.

Referring to FIG. 7 and FIG. 7A which are a top view and a side view, respectively, of a weight disc (16). The record optimizer system (10) further comprises a weight disc (16) removably positional on top of the phonograph record (34) which is positioned on top of the standard optimizing disc (114, 214, 314). The weight disc (16) comprises a weight disc platter (16A) having a weight disc platter spindle opening (16AA) centrally positioned therein. The measuring spindle post (118A, 218A, 318A) is positioned within the weight disc platter spindle opening (16AA). The weight disc platter (16A) further comprises a central protrusion at the opposite end of the of the spindle opening (16AA).

Figure 8:
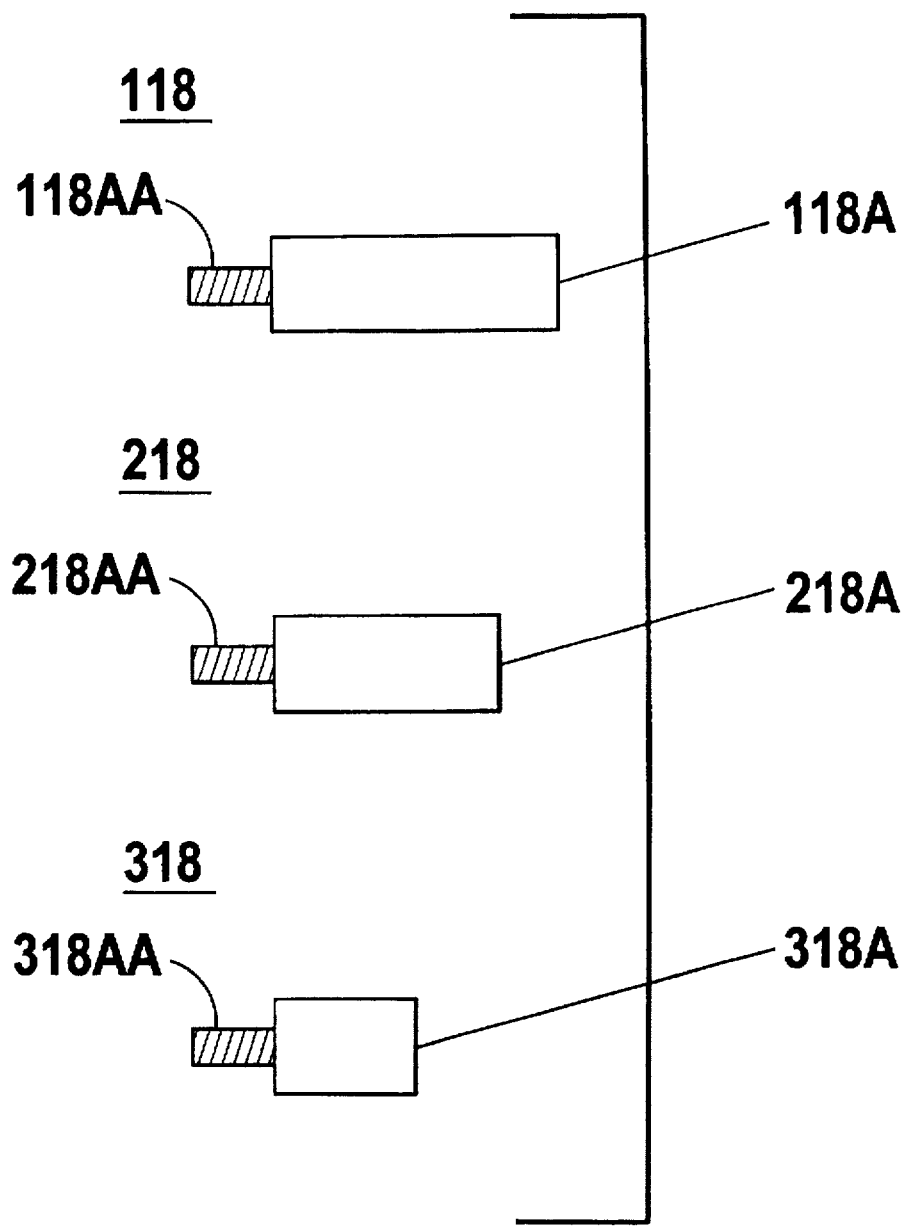
FIG. 8 are side views of a first measuring spindle, second measuring spindle, and third measuring spindle.
Figure 8A:
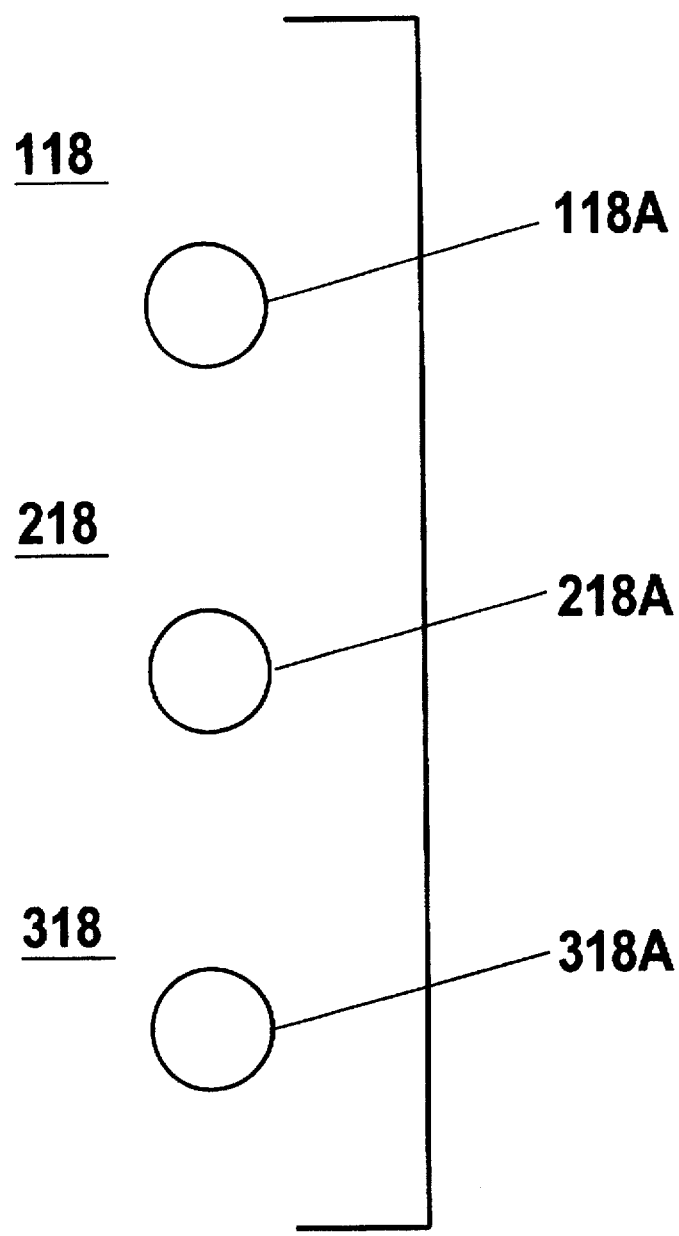
FIG. 8A are top views of a first measuring spindle, second measuring spindle, and third measuring spindle.

Referring to FIG. 8 and FIGURE 8A are side views and top views, respectively, of a first measuring spindle (118), second measuring spindle (218), and third measuring spindle (318). The record optimizer system (10) comprises a measuring spindle (118, 218, 318) which comprises a measuring spindle post (118A, 218A, 318A) securely attached to a measuring spindle post screw (118AA, 218AA, 318AA) which is removably attachable into a measuring base platter spindle receptacle (22AA) of a measuring base platter (22A) of a measuring base (22) which is rotatably positioned on a turntable (32).

Figure 9:
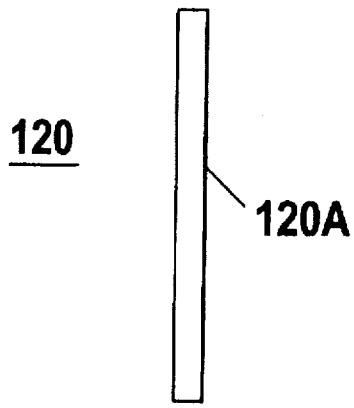
FIG. 9 are side views of a first spindle/base spacer, second spindle/base spacer, and third spindle/base spacer.
Figure 9:
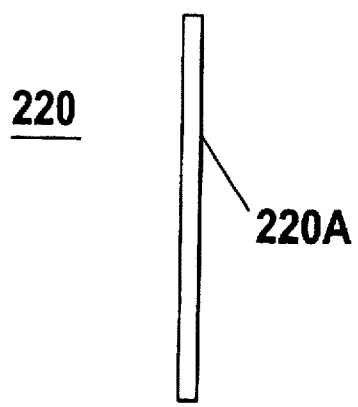
Figure 9:
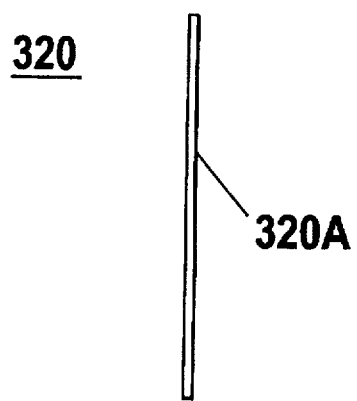
Figure 9A:
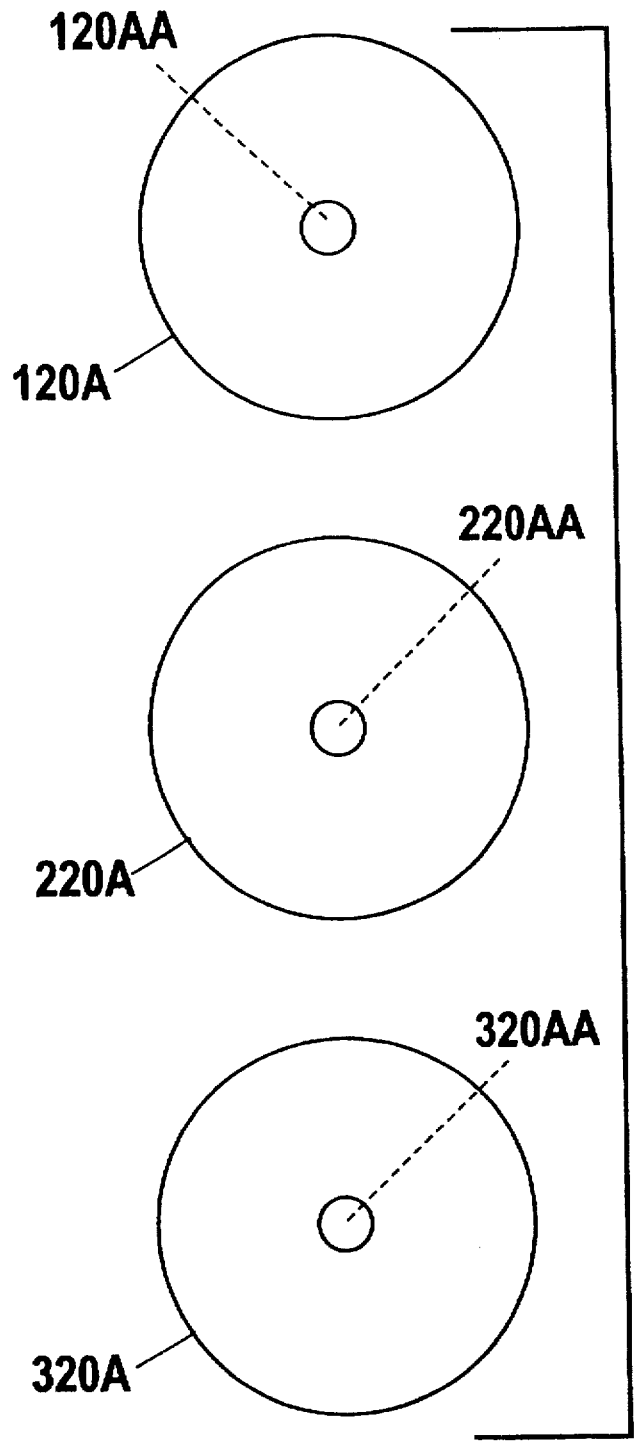
FIG. 9A are top views of a first spindle/base spacer, second spindle/base spacer, and third spindle/base spacer.

Referring to FIG. 9 are side views and top views, respectively, of a first spindle/base spacer (120), second spindle/base spacer (220), and third spindle/base spacer (320). The measuring spindle post (118A, 218A, 318A) further comprises a spindle/base spacer (120, 220, 320) having a spindle/base spacer cylinder (120A, 220A, 320A) with a spindle/base spacer cylinder opening (120AA, 220AA, 320AA) therein. The measuring spindle post (118A, 218A, 318A) is positioned within the spindle/base spacer cylinder opening (120AA, 220AA, 320AA).

Figure 10:
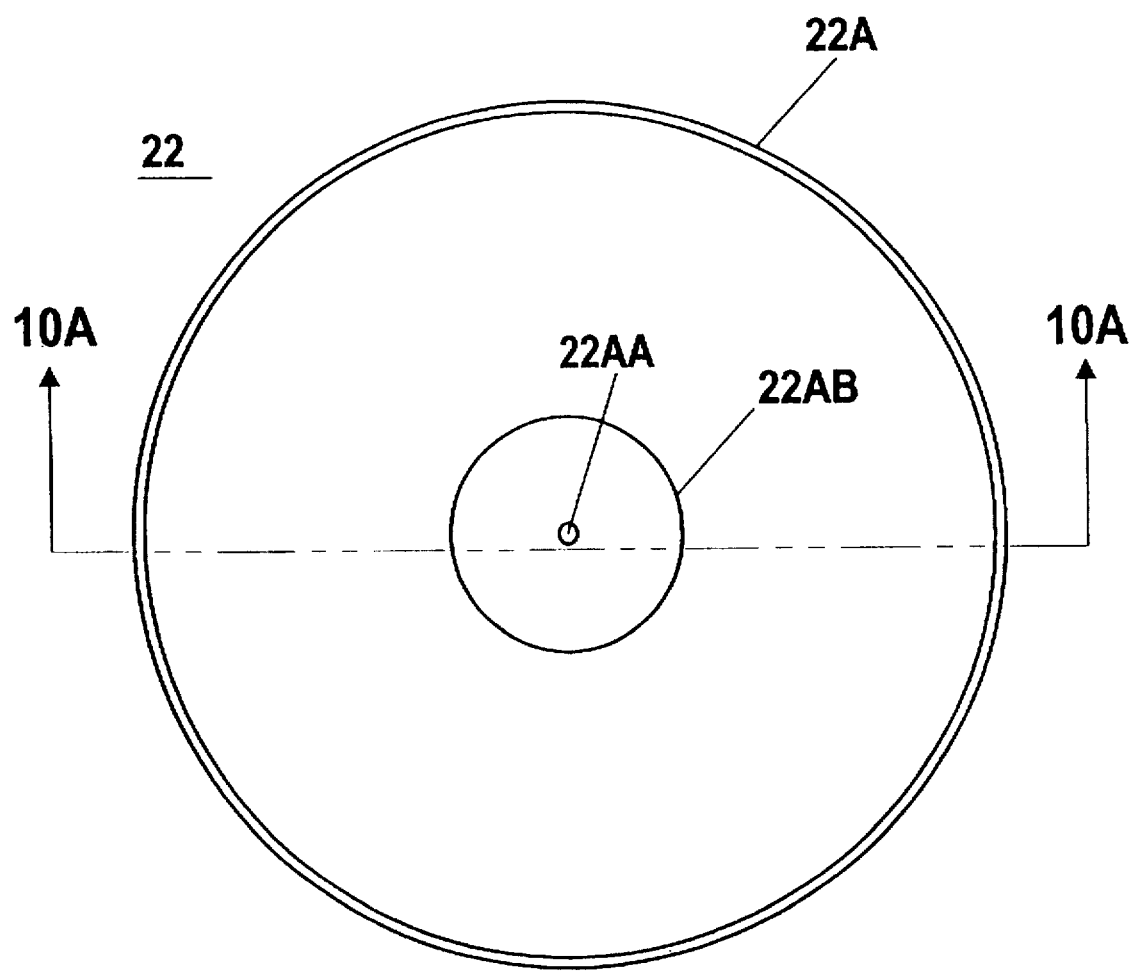
FIG. 10 is a top view of a measuring base.
Figure 10A:
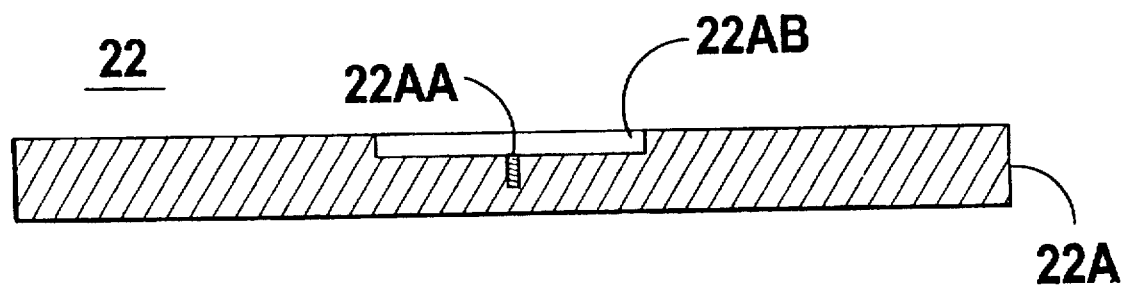
FIG. 10A is a side view of a measuring base.

Referring to FIG. 10 and FIG. 10A which are a top view and a side view of a measuring base (22). The measuring base (22) comprises a measuring base platter (22A) having a measuring base platter spindle receptacle (22AA) and a measuring base platter label recess (22AB) centrally positioned therein and thereon.

Figure 11:
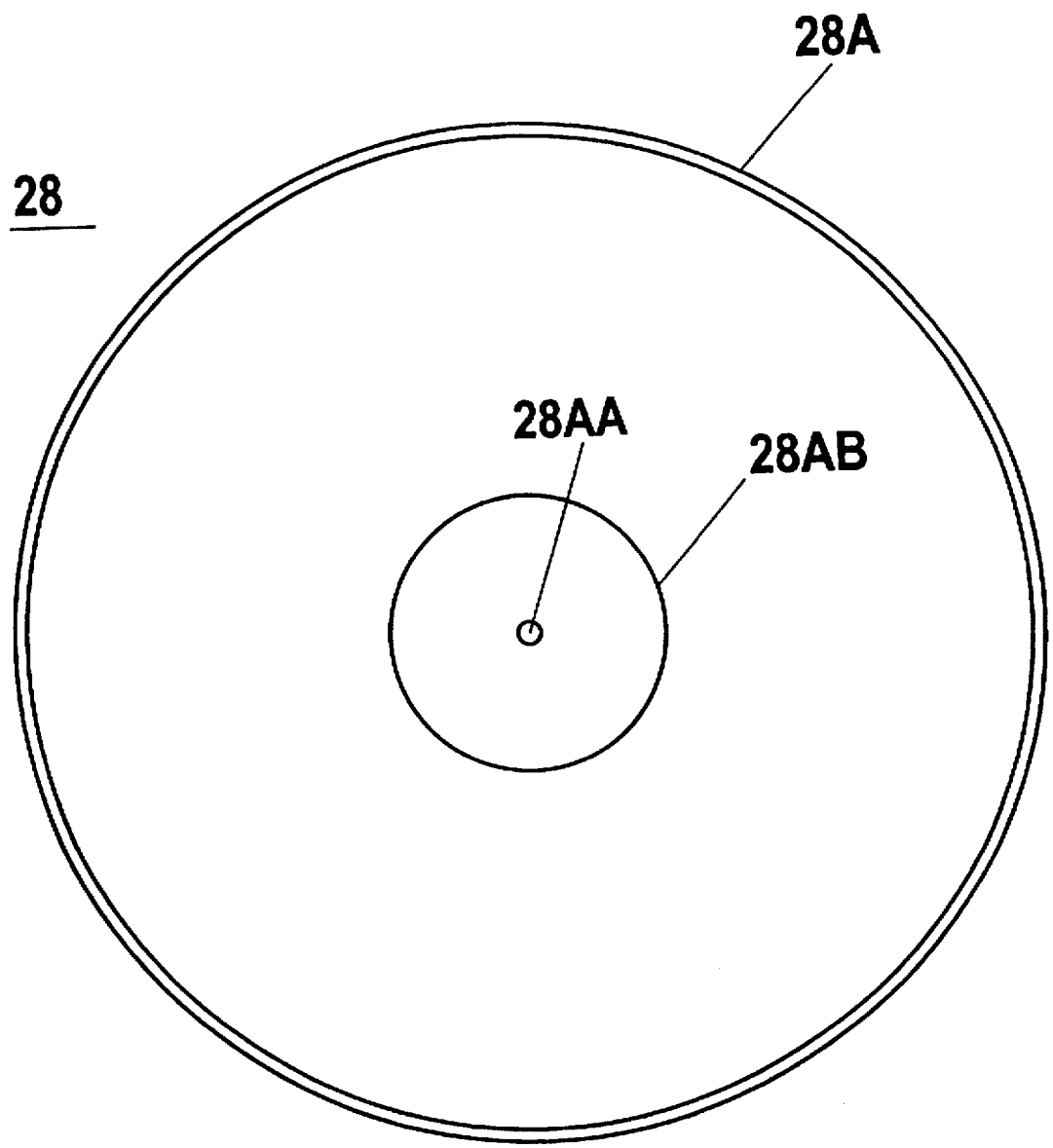
FIG. 11 is a top view of a equalizer disc.
Figure 11A:
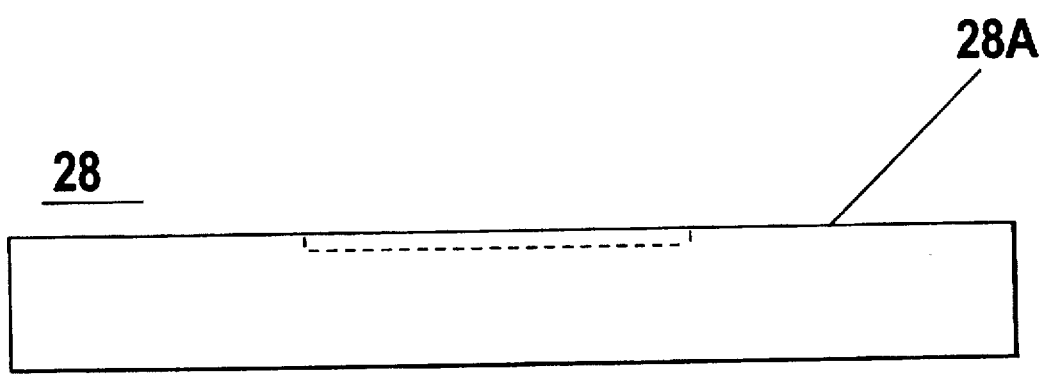
FIG. 11A is a side view of a equalizer disc.

Now referring to FIG. 11 and FIG. 11A which are a top view and a side view, respectively, of an equalizer disc (28). The equalizer disc (28) is positionable between the measuring base (22) and later between the turntable (32) and the phonograph record (34). The equalizer disc (28) comprises a equalizer disc platter opening (28AA) and a equalizer disc platter label recess (28AB) positioned therein and thereon, respectively.

Figure 12:
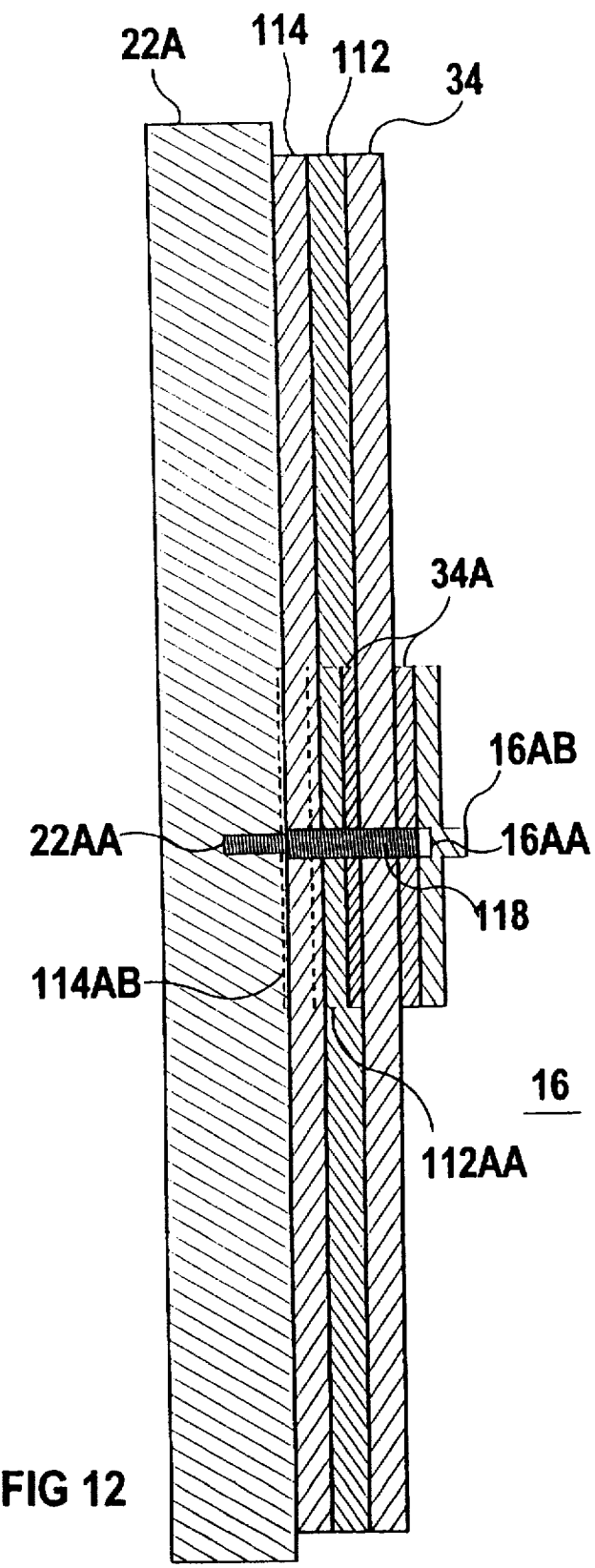
FIG. 12 is a side view cross sectional view of a measuring base platter with a first standard optimizing disc positioned thereon, a first center label cut out optimizing disc is positioned on the first standard optimizing disc, a phonograph record is positioned on the first center label cut out optimizing disc, and a weight disc is positioned on the phonograph record.
Figure 12A:
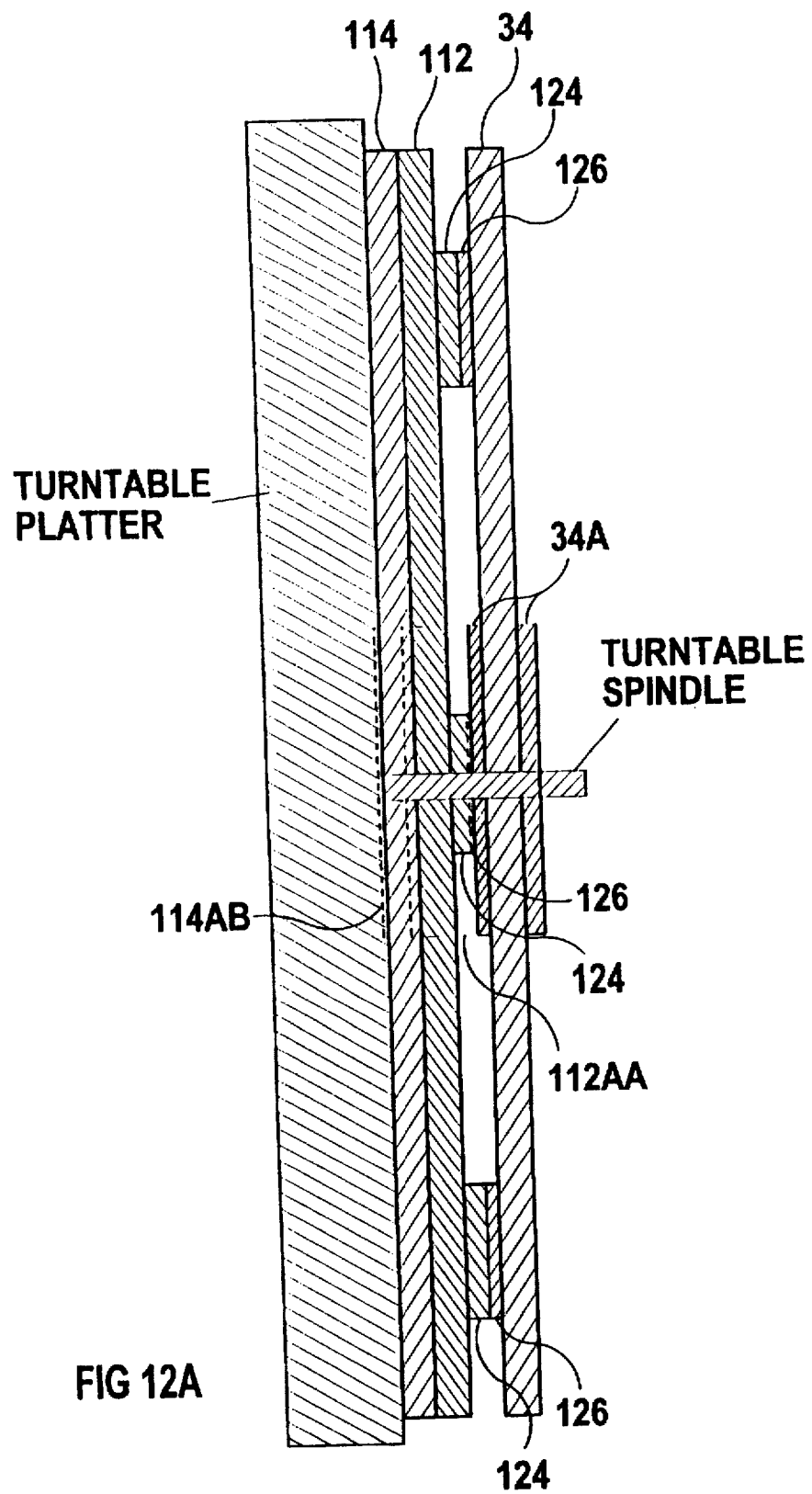
FIG. 12A is a side view cross sectional view of a turntable platter with a first standard optimizing disc positioned thereon, a first center label cut out optimizing is positioned on the first standard optimizing disc, a tuning disc set and a fine tuning disc set are positioned equidistant between the photograph record and the first center label cut out optimizing disc.

Referring to FIG. 12 which is a side view cross sectional view of a measuring base platter (22A) with a first standard optimizing disc (114) positioned thereon. A first center label cut out optimizing disc (112) is positioned on the first standard optimizing disc (114). A phonograph record (34) is positioned on the first center label cut out optimizing disc (112). A weight disc (16) is positioned on the phonograph record (34). Referring to FIG. 12A which is a side view cross sectional view of a turntable (32) with a first standard optimizing disc (114) positioned thereon, a first center label cut out optimizing disc (112) is positioned on the first standard optimizing disc (114), a phonograph record (34) is positioned on the first center label cut out optimizing disc (112), a tuning disc set and a fine tuning disc set are positioned equidistant between the phonograph record and the first center label cut out optimizing disc. The tuning disc set (124) and the fine tuning disc set (126) are varied to achieve the maximum fidelity for the turntable tone arm (32A) in relation to the phonograph record (34), and are used individually or together.

Figure 12B:
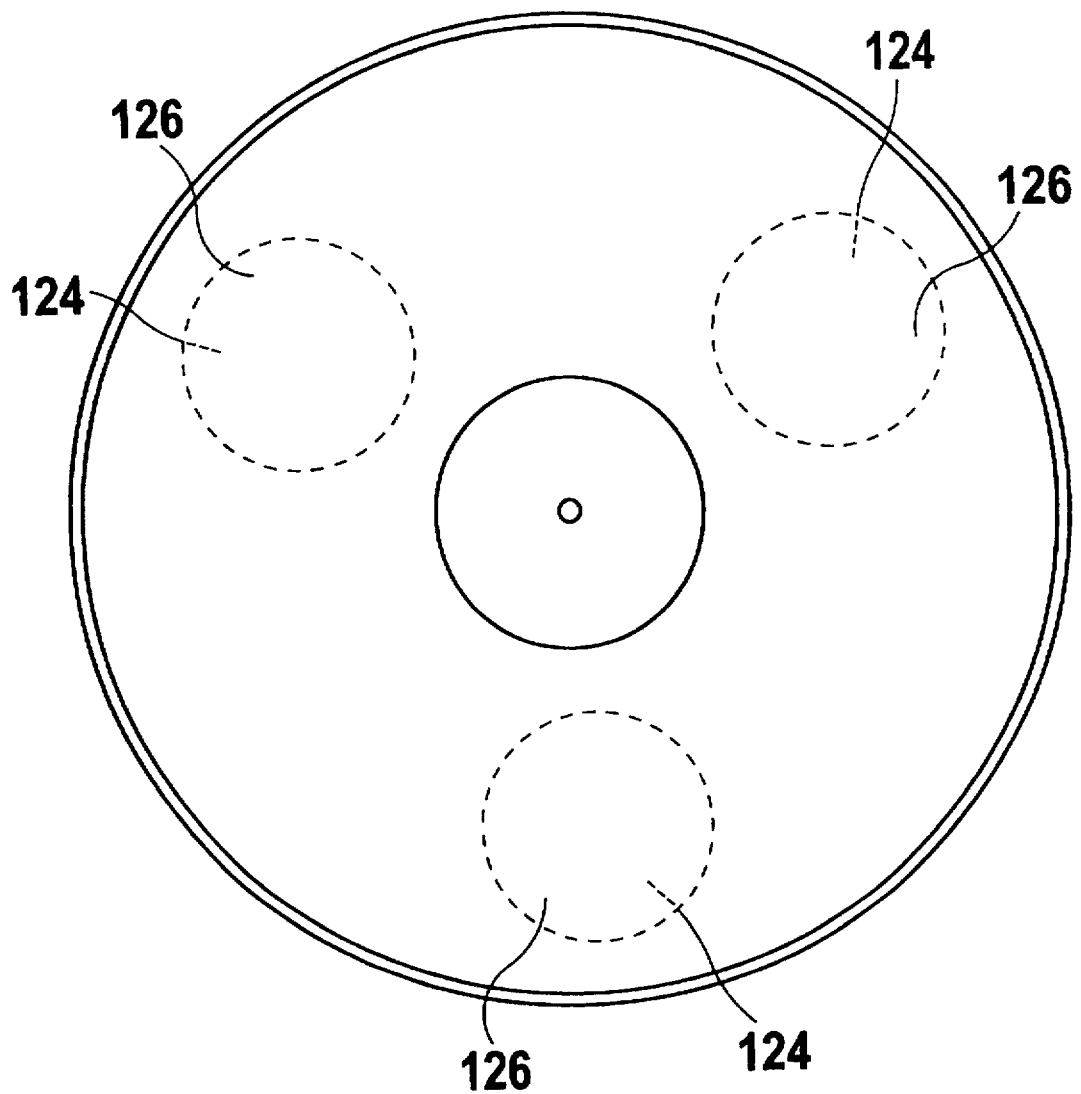
FIG. 12B is a top view of the above figure showing the position on the turntable platter of the tuning disc and fine tuning disc sets.

Referring to FIG. 12B which is a top view of the above figure showing the position on the turntable (32) of the tuning disc (124) and fine tuning disc (126) sets.

11

Figure 13:
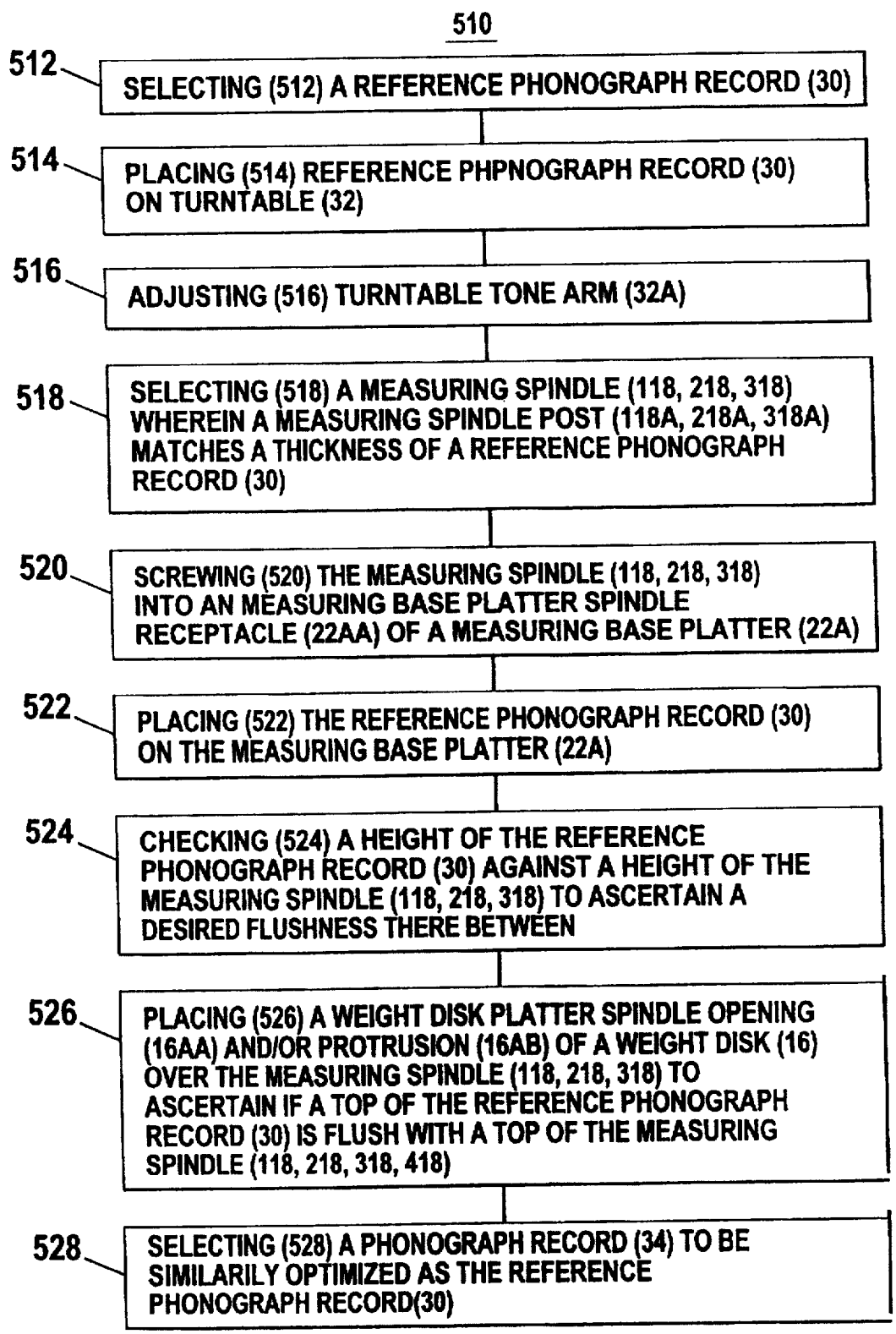
FIG. 13 is a diagrammatic flow diagram of a method of utilizing a record optimizer system.
Figure 13A:
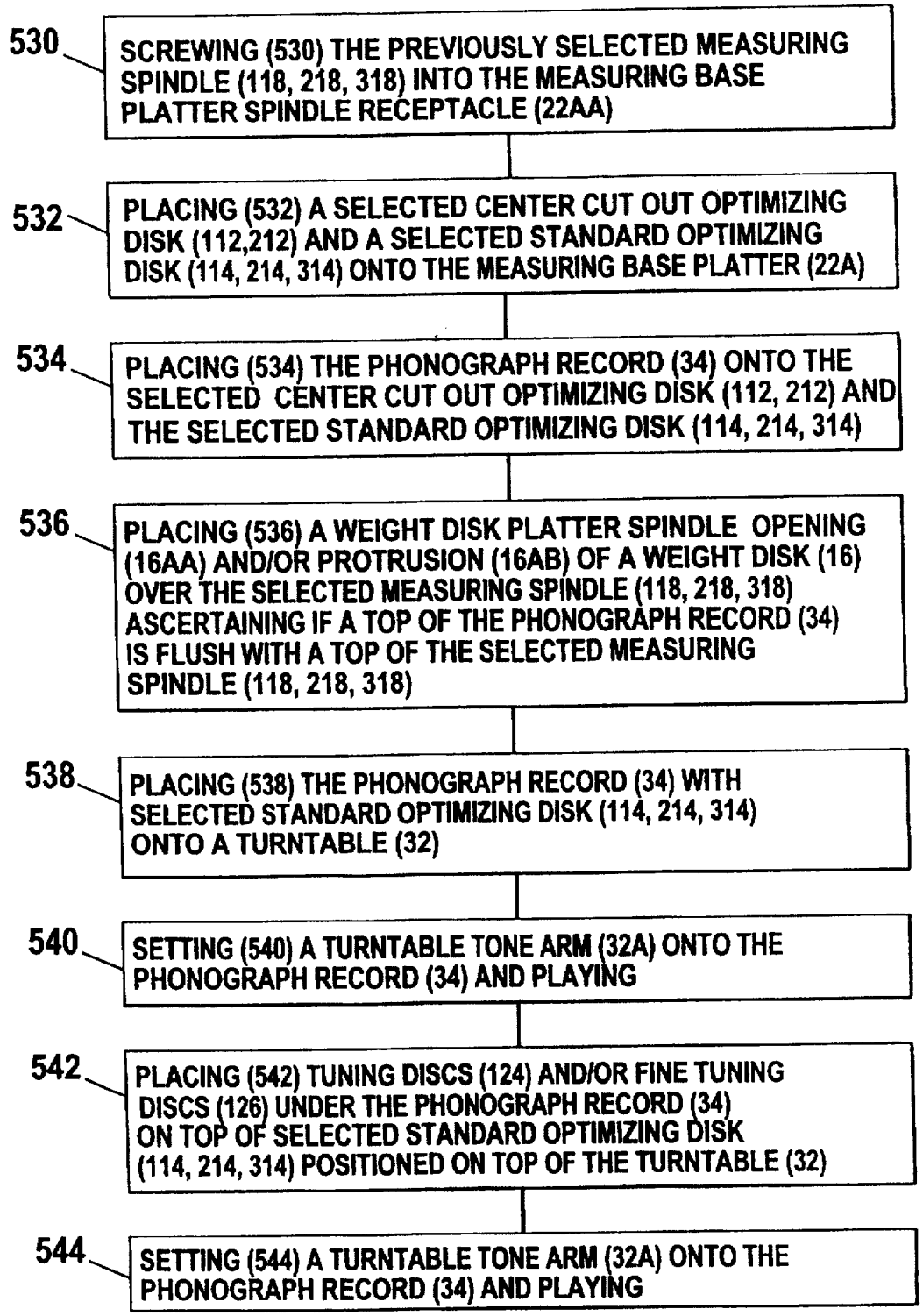
FIG. 13A is a continuation of a diagrammatic flow diagram of a method of utilizing a record optimizer system of FIG. 13.

Lastly, referring to FIG. 13 and FIG. 13A which are a diagrammatic flow diagram of a method (510) of utilizing a record optimizer system (10) consisting of the following steps.

A) selecting (512) a reference phonograph record (30);

B) placing (514) reference phonograph record (30) on turntable (32);

C) adjusting (516) turntable tone arm with mounted cartridge (32A);

D) selecting (518) a measuring spindle (118, 218, 318) wherein a measuring spindle post (118A, 218A, 318A) matches a thickness of a reference phonograph record (30);

E) screwing (520) the measuring spindle (118, 218, 318) into an measuring base platter spindle receptacle (22AA) of a measuring base platter (22A);

F) placing (522) the reference phonograph record (30) on the measuring base platter (22A);

G) checking (524) a height of the reference phonograph record (30) against a height of the measuring spindle (118, 218, 318) to ascertain a desired flushness there between;

H) placing (526) a weight disc platter spindle opening (16AA) and/or protrusion (16AB) of a weight disc (16) over the measuring spindle (118, 218, 318) to ascertain if a top of the reference phonograph record (30) is flush with a top of the measuring spindle (118, 218, 318, 418), the center protrusion of the LUCITE™ weight can be used in the same manner by confirming that the center protrusion does not extend downward into the spindle hole of the record. If it does, then the combination requires further optimization.

I) selecting (528) a phonograph record (34) to be similarly optimized as the reference phonograph record (30);

J) screwing (530) the previously selected measuring spindle (118, 218, 318) into the measuring base platter spindle receptacle (22AA);

K) placing (532) a selected center label cut out optimizing disc (112, 212) and a selected standard optimizing disc (114, 214, 314) onto the measuring base platter (22A);

L) placing (534) the phonograph record (34) onto the selected center label cut out optimizing disc (112, 212) and the selected standard optimizing disc (114, 214, 314);

M) placing (536) a weight disc platter spindle opening (16AA) and/or protrusion (116AB) of a weight disc (16) over the selected measuring spindle (118, 218, 318) ascertaining if a top of the phonograph record (34) is flush with a top of the selected measuring spindle (118, 218, 318), the center protrusion of the LUCITE™ weight can be used in the same manner by confirming that the center protrusion dies not extend downward into the spindle hole of the record. If it does, then the combination requires further optimization;

N) placing (538) the phonograph record (34) with selected standard optimizing disc (114, 214, 314) onto a turntable (32);

O) setting (540) a turntable tone arm with mounted cartridge (32A) onto the phonograph record (34) and playing;

P) placing (542) tuning disc set (124) and/or fine tuning disc set (126) under the phonograph record (34) on top of selected standard optimizing disc (114, 214, 314) positioned on top of the turntable (32); and Q) setting (544) a turntable tone arm with mounted cartridge (32A) onto the phonograph record (34) and playing.

The method (510) of utilizing a record optimizer system (10) further comprises an equalizer disc (28) which is

12 positionable between the measuring base (22) and the phonograph record (34) and then between the turntable (32) and the phonograph record (34). The equalizer disc (28) comprises a equalizer disc platter opening (28AA) and a equalizer disc platter label recess (28AB) positioned therein and thereon, respectively.

The measuring spindle post (118A, 218A, 318A) further comprises a spindle/base spacer (120, 220, 320) having a spindle/base spacer cylinder (120A, 220A, 320A) with a spindle/base spacer cylinder opening (120AA, 220AA, 320AA) therein. The measuring spindle post (118A, 218A, 318A) is positioned within the spindle/base spacer cylinder opening (120AA, 220AA, 320AA). The measuring spindle (118, 218, 318), the standard optimizing disc (114, 214, 314), the weight disc (16), the tuning disc set (124), the fine tuning disc set (126), the equalizer disc (28), and the spindle/base spacer (120, 220, 320) are manufactured from a material selected from a group consisting of metal, metal alloy, plastic, plastic composite, rubber, rubber composite, fiberglass, epoxy, carbon-graphite, acrylic, and vinyl.

It will be understood that each of the elements described above, or two or more together, may also find a useful application in other types of constructions differing from the type described above.

While the invention has been illustrated and described as embodied in a record optimizer system, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

What is claimed is:

1. A record optimizer system (10) which functions to adjust a height of a phonograph record (34) which maximizes fidelity reception from a turntable tone arm with mounted cartridge (32A) of a turntable (32), the record optimizer system (10) comprising:

A) a measuring spindle (118, 218, 318) which comprises a measuring spindle post (118A, 218A, 318A) securely attached to a measuring spindle post screw (118AA, 218AA, 318AA) which is removably attachable into a measuring base platter spindle receptacle (22AA) of a measuring base platter (22A) of a measuring base (22), B) a standard optimizing disc (114, 214, 314) which comprises a standard optimizing disc platter (114A, 214A, 314A) having a standard optimizing disc platter opening (114AA, 214AA, 314AA) and a standard optimizing disc platter label recess (114AB, 214AB, 314AB) centrally positioned therein and thereon, respectively, the standard optimizing disc (114, 214, 314) is positioned upon the measuring base platter (22A), the measuring spindle post (118A, 218A, 318A) is positioned within the standard optimizing disc platter opening (114AA, 214AA, 314AA);

C) a selected center label cut out optimizing disc (112, 212) which comprises a center label cut out optimizing disc platter (112A, 212A) having a center label cut out optimizing disc platter opening (112AA, 212AA) centrally positioned therein, the selected center label cut out optimizing disc (112, 212) is positioned upon the standard optimizing disc (114, 214, 314), a phonograph record (34) is positioned on the selected center label cut out optimizing disc (112, 212);

D) a weight disc (16) removably positioned on top of the phonograph record (34) which is positioned on top of the standard optimizing disc (114, 214, 314), the weight disc (16) comprises a weight disc platter (16A) having a weight disc platter spindle opening (16AA) and protrusion (16AB) on underside centrally positioned therein, the measuring spindle post (118A, 218A, 318A) is positioned within the weight disc platter spindle opening;

E) a tuning disc set which is positioned between the standard optimizing disc and the phonograph record; and F) a fine tuning disc set positioned between the tuning disc set and the phonograph record.

2. The record optimizer system (10) as described in claim 1, wherein the measuring base platter (22A) further comprises a measuring base platter label recess (22AB) which functions to compensate for a label affixed onto the phonograph record (34).

3. The record optimizer system (10) as described in claim 1 further comprises an equalizer disc (28) which is positionable between the measuring base (22) and later between the turntable (32) and the phonograph record (34), the equalizer disc (28) comprises a equalizer disc platter opening (28AA) and a equalizer disc platter label recess (28AB) positioned therein and thereon, respectively.

4. The record optimizer system (10) as described in claim 1, wherein the measuring spindle post (118A, 218A, 318A) further comprises a spindle/base spacer (120, 220, 320) having a spindle/base spacer cylinder (120A, 220A, 320A) with a spindle/base spacer cylinder opening (120AA, 220AA, 320AA) therein, the measuring spindle post (118A, 218A, 318A) is positioned within the spindle/base spacer cylinder opening (120AA, 220AA, 320AA).

5. The record optimizer system (10) as described in claim 1, wherein the measuring spindle (118, 218, 318), the standard optimizing disc (114, 214, 314), the weight disc (16), the tuning disc set (124), the fine tuning disc set (126), the equalizer disc (28), and the spindle/base spacer (120, 220, 320) are manufactured from a material selected from a group consisting of metal, metal alloy, plastic, plastic composite, rubber, rubber composite, fiberglass, epoxy, carbon-graphite, acrylic, and vinyl.

6. A method (510) of utilizing a record optimizer system (10) consisting of the steps of:

A) selecting (512) a reference phonograph record (30);

B) placing (514) reference phonograph record (30) on turntable (32);

C) adjusting (516) turntable tone arm with mounted cartridge (32A);

D) selecting (518) a measuring spindle (118, 218, 318) wherein a measuring spindle post (118A, 218A, 318A) matches a thickness of a reference phonograph record (30);

E) screwing (520) the measuring spindle (118, 218, 318) into an measuring base platter spindle receptacle (22AA) of a measuring base platter (22A);

F) placing (522) the reference phonograph record (30) on the measuring base platter (22A);

G) checking (524) a height of the reference phonograph record (30) against a height of the measuring spindle (118, 218, 318) to ascertain a desired flushness there between;

H) placing (526) a weight disc platter spindle opening (16AA) of a weight disc (16) over the measuring spindle (118, 218, 318) to ascertain if a top of the reference phonograph record (30) is flush with a top of the measuring spindle (118, 218, 318, 418), the weight disc platter further comprising a protrusion on the underside to ascertain if a top of the phonograph record is flush with a top of the measuring spindle (118, 218, 318);

I) selecting (528) a phonograph record (34) to be similarly optimized as the reference phonograph record (30);

J) screwing (530) the previously selected measuring spindle (118, 218, 318) into the measuring base platter spindle receptacle (22AA);

K) placing (532) a selected center label cut out optimizing disc (112, 212) and a selected standard optimizing disc (114, 214, 314) onto the measuring base platter (22A);

L) placing (534) the phonograph record (34) onto the selected center label cut out optimizing disc (112, 212) and the selected standard optimizing disc (114, 214, 314);

M) placing (536) a weight disc platter spindle opening (16AA)/protrusion (16AB) of a weight disc (16) over the selected measuring spindle (118, 218, 318) ascertaining if a top of the phonograph record (34) is flush with a top of the selected measuring spindle (118, 218, 318);

N) placing (538) the phonograph record (34) with selected standard optimizing disc (114, 214, 314) onto a turntable (32);

O) setting (540) a turntable tone arm with mounted cartridge (32A) onto the phonograph record (34) and playing;

P) placing (542) at least one of a tuning disc set (124) and a fine tuning disc set (126) under the phonograph record (34) on top of selected standard optimizing disc (114, 214, 314) positioned on top of the turntable (32); and Q) setting (544) a turntable tone arm with mounted cartridge (32A) onto the phonograph record (34) and playing.

7. The method (510) of utilizing a record optimizer system (10) as described in claim 6 further comprises an equalizer disc (28) which is positionable between the measuring base (22) and the phonograph record (34), the equalizer disc (28) used both on the turntable and the measuring base (22), the equalizer disc (28) comprises a equalizer disc platter opening (28AA) and a equalizer disc platter label recess (28AB) positioned therein and thereon, respectively.

8. The method (510) of utilizing a record optimizer system (10) as described in claim 6, wherein the measuring spindle post (118A, 218A, 318A) further comprises a spindle/base spacer (120, 220, 320) having a spindle/base spacer cylinder (120A, 220A, 320A) with a spindle/base spacer cylinder opening (120AA, 220AA, 320AA) disc set (126) under therein, the measuring spindle post (118A, 218A, 318A) is positioned within the spindle/base spacer cylinder opening (120AA, 220AA, 320AA).

9. The method (510) of utilizing a record optimizer system (10) as described in claim 6, wherein the measuring spindle (118, 218, 318), the standard optimizing disc (114, 214, 314), the weight disc (16), the tuning disc set (124), the fine tuning disc set (126), the equalizer disc (28), and the spindle/base spacer (120, 220, 320) are manufactured from a material selected from a group consisting of metal, metal alloy, plastic, plastic composite, rubber, rubber composite, fiberglass, epoxy, carbon-graphite, acrylic, and vinyl.

* * * * *